US008891368B2

(12) United States Patent
Atkinson et al.

(10) Patent No.: US 8,891,368 B2
(45) **Date of Patent: *Nov. 18, 2014**

(54) PRESENTATION OF A SELECTED PORT

(75) Inventors: Michael Atkinson, Santa Clara, CA (US); Vineet Abraham, Sunnyvale, CA (US); Sathish Gnanasekaran, Sunnyvale, CA (US); Rishi Sinha, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 565 days.

This patent is subject to a terminal disclaimer.

(21) Appl. No.: 12/614,268

(22) Filed: Nov. 6, 2009

(65) Prior Publication Data

US 2011/0110241 A1 May 12, 2011

(51) Int. Cl.
*H04L 12/26* (2006.01)
*H04L 12/24* (2006.01)

(52) U.S. Cl.
CPC ............ *H04L 43/0811* (2013.01); *H04L 41/22* (2013.01); *H04L 41/0677* (2013.01)
USPC ......... 370/230.1; 370/352; 370/252; 370/419

(58) Field of Classification Search
None
See application file for complete search history.

(56) References Cited

U.S. PATENT DOCUMENTS 5,633,861 A 5/1997 Hanson
5,638,359 A 6/1997 Peltola
5,719,853 A 2/1998 Ikeda
5,970,048 A 10/1999 Pajuvirta
5,987,008 A * 11/1999 Simpson et al. .............. 370/236
6,014,383 A 1/2000 McCarty
6,091,725 A 7/2000 Cheriton
6,122,251 A 9/2000 Shinohara
6,160,793 A 12/2000 Ghani
6,185,189 B1 2/2001 Brassier
6,233,236 B1 5/2001 Nelson
6,381,642 B1 4/2002 O'Donnell
6,427,114 B1 7/2002 Olsson
6,724,722 B1 4/2004 Wang et al.
6,771,596 B1 * 8/2004 Angle et al. .................. 370/229
7,145,868 B2 12/2006 Giroux (Continued)

OTHER PUBLICATIONS

U.S. Appl. No. 12/614,256 entitled "Method and System for Traffic Management," filed Nov. 6, 2009.

(Continued)

*Primary Examiner* — Huy D Vu
*Assistant Examiner* — Zewdu A Beyen
(74) *Attorney, Agent, or Firm* — Wong, Cabello, Lutsch, Rutherford & Brucculeri, L.L.P.

(57) ABSTRACT

Back pressure is mapped within a network, and primary bottlenecks are distinguished from dependent bottlenecks. Further, the presently disclosed technology is capable of performing network healing operations designed to reduce the data load on primary bottlenecks while ignoring dependent bottlenecks. Still further, the presently disclosed technology teaches identifying and/or suggesting a switch port for adding a node to the network. More specifically, various implementations analyze traffic load and back pressure in a network, identify primary and dependent bottlenecks, resolve the primary bottlenecks, collect new node parameters, and/or select a switch port for the new node. Further, a command can be sent to a selected switch to activate an indicator on the selected port. New node parameters may include new node type, maximum load, minimum load, time of maximum load, time of minimum load and type of data associated with the new node.

13 Claims, 18 Drawing Sheets

(56) References Cited

U.S. PATENT DOCUMENTS

| | | | | |
|---|---|---|---|---|
| 7,216,192 | B2 | 5/2007 | Boulay et al. | |
| 7,292,580 | B2 * | 11/2007 | Ramamurthy et al. | 370/395.42 |
| 7,430,164 | B2 | 9/2008 | Bare | |
| 7,633,861 | B2 | 12/2009 | Willhite | |
| 2004/0075401 | A1 * | 4/2004 | Segan et al. | 315/291 |
| 2006/0056308 | A1 | 3/2006 | Gusat | |
| 2007/0070901 | A1 | 3/2007 | Aloni | |
| 2008/0181111 | A1 | 7/2008 | Felter | |

OTHER PUBLICATIONS

U.S. Appl. No. 12/614,286 entitled "Back Pressure Remediation," filed Nov. 6, 2009.

U.S. Appl. No. 12/614,254 entitled "Automatic Switch Port Selection," filed Nov. 6, 2009.

* cited by examiner

400

| | Network Bottlenecks | | Edge Bottlenecks | |
|---|---|---|---|---|
| | Primary | Dependent | Primary | Dependent |
| Slow-drain Bottleneck | X | X | X | |
| Congestion Bottleneck | X | | X | |

FIG. 4

PRESENTATION OF A SELECTED PORT

CROSS-REFERENCE TO RELATED APPLICATIONS

This application is related to U.S. Nonprovisional application Ser. No. 12/614,286, entitled, "Back Pressure Remediation," filed on Nov. 6, 2009; U.S. Nonprovisional application Ser. No. 12/614,254, entitled, "Automatic Switch Port Selection," filed on Nov. 6,2009; and U.S. Nonprovisional application Ser. No. 12/614,256, entitled, "Method and System for Traffic Management," filed on November 6,2009, all of which are specifically incorporated by reference for all that they disclose and teach.

BACKGROUND

Communications networks, including without limitation wide area networks ("WANs"), local area networks ("LANs"), and storage area networks ("SANs"), may be implemented as a set of interconnected switches that connect a variety of network-connected nodes to communicate data and/or control packets among the nodes and switches. For example, a SAN may be implemented as a high-speed, special purpose network that interconnects different kinds of data storage devices with associated data servers on behalf of a large network of users. Typically, a SAN includes high performance switches as part of an overall network of computing resources for an enterprise. A SAN may be clustered in close geographical proximity to other computing resources, such as mainframe computers, but may also extend to remote locations, such as other enterprise sites, for backup and archival storage using wide area network carrier technologies. Data storage devices and data servers may be collectively referred to as "nodes" connected to the network.

Fibre Channel networking is typically used in SANs although other communications technologies may also be employed, including Ethernet and IP-based storage networking standards (e.g., iSCSI, FCIP (Fibre Channel over IP), etc.). As used herein, the term "Fibre Channel" refers to the Fibre Channel (FC) family of standards (developed by the American National Standards Institute (ANSI)) and other related and draft standards. In general, Fibre Channel defines a transmission medium based on a high speed communications interface for the transfer of large amounts of data via connections between varieties of hardware devices. Other networking protocols may additionally or alternatively be employed, such as raw Ethernet, TCP/IP, UDP, etc.

Operating a network of interconnected network switches in a network becomes increasingly difficult as the number of network switches within the network increases and greater packet transfer rates are required. Further, modern networks demand fewer cyclic redundancy check errors and dropped packets within the increasingly complex networks. As such, current techniques for managing networks through switch-level problem management schemes may be insufficient to satisfy the increasingly challenging performance requirements of evolving networks. For example, strictly switch-level problem management schemes may be too slow and allow too many dropped packets. Further, strictly switch-level problem management techniques fail to distinguish between primary bottlenecks in the network and bottlenecks that are dependent on the primary bottlenecks. As a result, strictly switch-level problem management does not efficiently focus efforts to resolve performance issues at primary bottlenecks within the network.

Further, when a node is added to the network, a user such as an administrator or network technician manually chooses a port on a switch and connects the node to the chosen port via a communications link. There are a number of factors that may impact which switch and/or switch port is best, or at least acceptable, for attaching a new node. For example, relevant factors may include without limitation back pressure within the network, bottlenecked ports on switches, expected traffic load to and from the node, other nodes attached to the switches, traffic load already being handled by each switch, the time of day of use (or nonuse) of the node, type of node to be attached, topology constraints, etc. Unfortunately, the user may not know, or have access to, all the factors that contribute to switch and port selection, or the values of those factors. As such, it is often difficult for the user to make an informed decision about the best, or otherwise acceptable, point at which to attach a node to the network. The decision about where to attach a node to the network is often no better than a guess.

SUMMARY

Implementations of the presently disclosed technology relate to mapping back pressure within a network and distinguishing primary bottlenecks from dependent bottlenecks. Further, the presently disclosed technology is capable of performing network healing operations designed to focus reducing the data traffic load on primary bottlenecks. Still further, the presently disclosed technology teaches selecting and/or suggesting a switch port for adding a node to the network.

More specifically, various implementations analyze traffic load and back pressure in a network, map back pressure, identify primary bottlenecks, resolve the primary bottlenecks, collect new node device parameters, and/or select/suggest a switch port for connecting a new node. Further, a command can be sent to a selected switch to activate an indicator on the suggested port. The new node device parameters can be received from a user through a user interface or other input. The new node device parameters may include without limitation a new node type, a maximum load, a minimum load, a time of maximum load, a time of minimum load, and a type of data associated with the new node. Switch configuration parameters, such as buffer credit schemes and/or routing policies or algorithms, may also be considered. Load statistics can be determined from data collected dynamically from the switches and/or network configuration data stored locally. A port is selected according to switch port selection criteria. The selected port can be suggested or identified to a user using an indicator on the corresponding switch.

Other implementations are also described and recited herein.

BRIEF DESCRIPTIONS OF THE DRAWINGS

FIG. 4 depicts example classifications of bottlenecks according to the presently disclosed technology.

DETAILED DESCRIPTIONS

Figure 1:
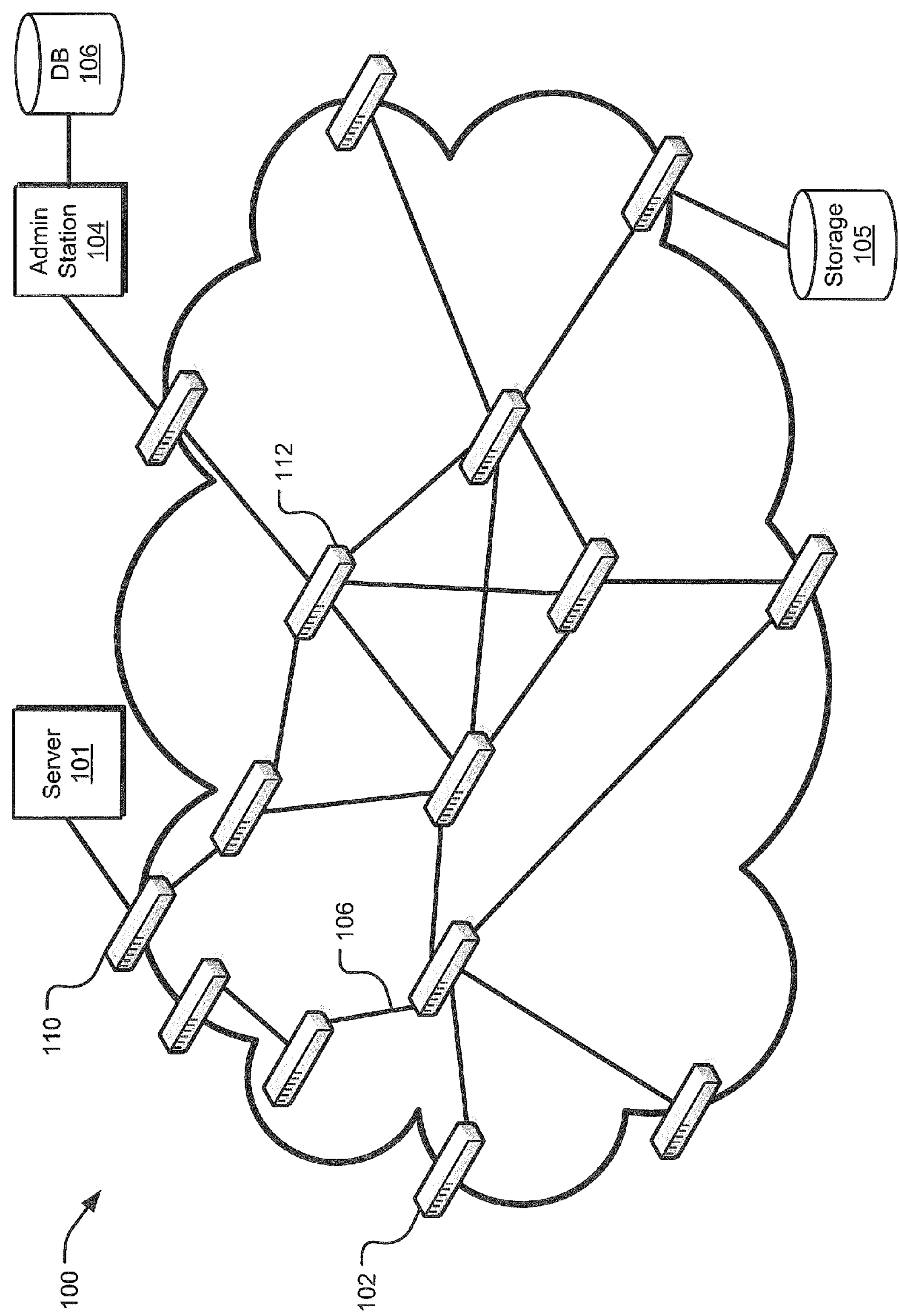
FIG. 1 illustrates an example network of switches interconnected by links.

The presently disclosed technology involves a network-level problem management scheme including quick identification, isolation, and remediation of network-level data path problems. This management scheme can include both online and offline analysis and may operate on a variety of governing network protocols that experience back pressure (e.g., Fibre Channel (FC), Fibre Channel over Ethernet (FCoE), Converged Enhanced Ethernet (CEE), etc.) of the network. Specifically, the network-level problem management scheme identifies bottlenecks (including congestion and slow-drain latencies) in the network, maps back pressure caused by the bottlenecks, distinguishes primary bottlenecks from dependent bottlenecks, uses the back pressure mapping to perform healing operations on the network, and/or makes provisioning suggestions regarding new nodes to be attached to the network based on the back pressure mapping.

The nodes discussed herein refer to any electronic device attached to the network that is capable of sending information into the network or receiving information from the network. Examples of the nodes include without limitation computer servers, computer workstations, and data storage devices. In contrast, switches discussed herein refer to switching elements within the network, whether at the edge of the network or deep within the network. In a Fibre Channel example, an N_PORT of a node connects to an F_PORT of an edge switch to allow the node to communicate with other nodes through the network. The edge switch, in turn, connects through the network via other internal network switches, typically, to another edge switch, which connects to a node on another side of the network. This connectivity allows the nodes to communicate through the network.

An egress port of a switch within the network can become a bottleneck if it is unable to transmit packets over a communications link fast enough to handle the packets it is concurrently receiving from ingress ports feeding the egress port. As such, packets backup (e.g., attempt to continuously overfill one or more receive queues that are feeding the bottlenecked egress port) at the associated ingress ports because the bottlenecked egress port is unable to keep up with the incoming bandwidth demands at that egress port. In this configuration, the egress port can be deemed a “bottleneck” of the network.

Back pressure is caused by various interrelated bottlenecks in a network of switches. When one port is bottlenecked, it can slow the traffic through an upstream port (i.e., a port that is upstream with respect to traffic flow), and the upstream port can then become a bottleneck itself. This phenomenon is referred to as “back pressure”. The back pressure among multiple bottlenecks can be mapped in a back pressure system among affected links between the bottlenecks, which is referred to as “back pressure mapping”. The back pressure can then be followed downstream with respect to traffic flow to a source of the back pressure, which can be identified as a “primary bottleneck”. The bottlenecks positioned upstream (with respect to traffic flow) of the primary bottleneck(s) are designated as “dependent bottlenecks” (e.g., dependent on one or more primary bottlenecks). This information can then be used to perform network healing operations and make network provisioning recommendations and/or decisions.

FIG. 1 illustrates an example network 100 of switches, such as switch 102 interconnected by inter-switch links, such as inter-switch link 106. Information contained in packets is transmitted through the network 100 among the various switches 102 in the network 100 to/from various nodes that are connected to the network 100.

The transfer of packets throughout the network 100 results in some links carrying a greater load of packets than other links. Often, the packet capacity of one or more links is oversaturated (or “congested”) by traffic flow, and therefore, the ports connected to such links becomes bottlenecks in the network 100. In addition, bottlenecked ports can also result from “slow drain” conditions, even when the associated links are not oversaturated. Generally, a slow drain condition can result from various conditions, although other slow drain conditions may be defined: (1) a slow node outside the network is not returning enough credits to the network to prevent the connected egress port from becoming a bottleneck; (2) upstream propagation of back pressure within the network; and (3) anode has been allocated too few credits to fully saturate a link. As such, slow drain conditions can also result in bottlenecked ports.

Nodes, such as server 101 and storage device 105, may be connected to the network 100 and can operate to communicate data through the network 100 between each other. Further, in one implementation, processor-readable firmware and associated circuitry within each switch can be employed to provide a network provisioning engine and a network healing engine, with one or more of the switches including memory for storing port selections rules, routing policies and algorithms, buffer credit schemes, and traffic statistics. One or more switches may consolidate the distributed information collected from each switch and manage the bottleneck identification, back pressure mapping, and/or provisioning/healing operations. In another implementation, an administrative station 104 is connected to the network 100 and can contain one or both of a network provisioning engine and network healing engine, discussed in more detailed with respect to FIG. 17. An administrative database 106 (DB) is connected to the administrative station 104 that stores one or more of port selection rules, routing policies and algorithms, buffer credit schemes, and traffic statistics, which are also discussed in more detail with respect to FIG. 17. The administrative station 104 is configured with software and circuitry to identify bottlenecks, map back pressure, identify and resolve the primary bottlenecks, collect new node device parameters, and/or suggest a switch port to which a new node should be connected. In yet another implementation, a combination of firmware and administrative logic is employed.

Switches that are connected at the edge of the network 100 (e.g., switch 110) are referred to as "edge switches", and they may connect to nodes or other devices (e.g., an access gateway) that are external to the network. In contrast, other switches that do not reside on the edge of the network 100 (e.g., switch 112) are referred to herein as "internal network switches", so as to distinguish them from edge switches.

Figure 2:
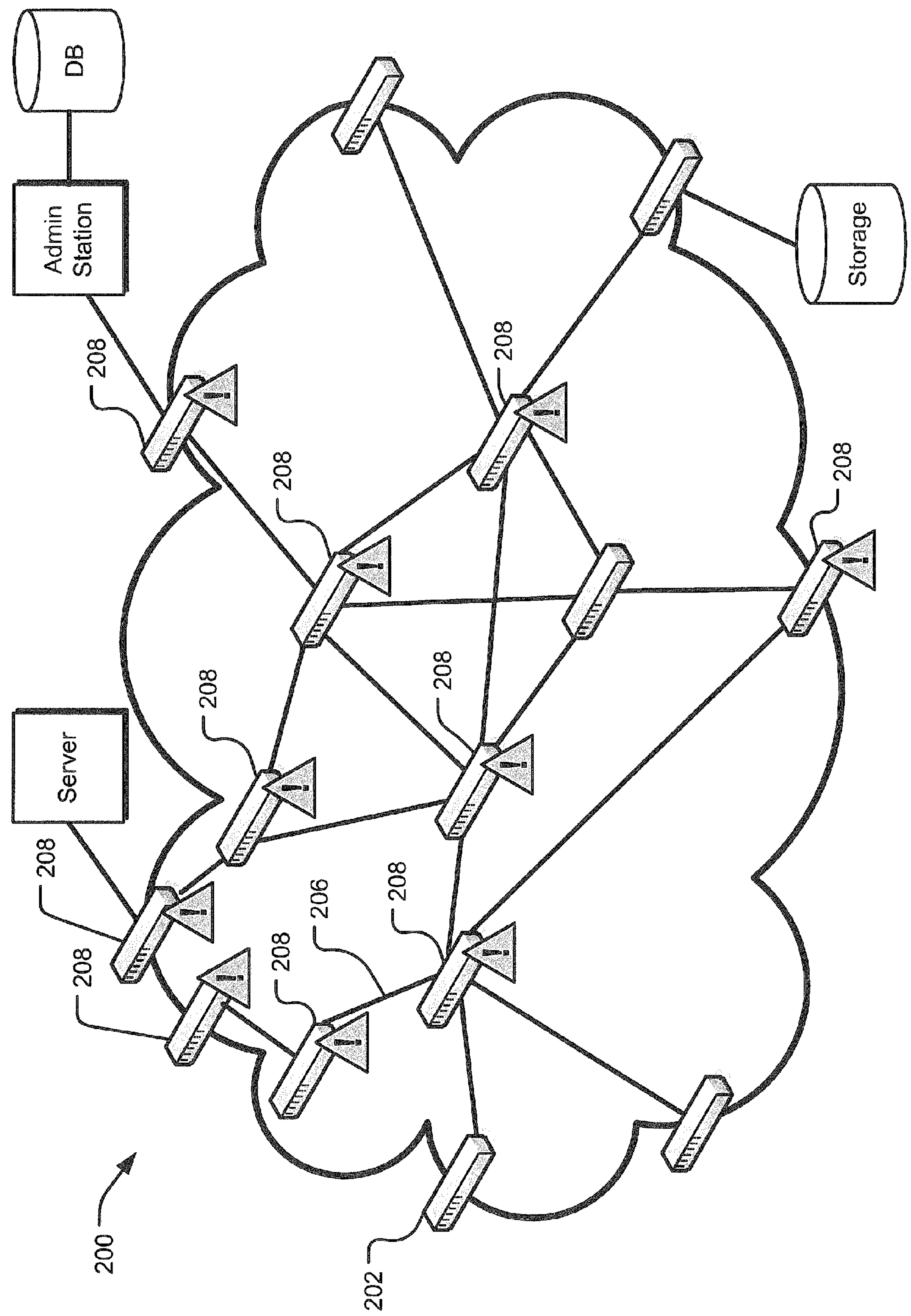
FIG. 2 illustrates an example network of switches interconnected by links with some switches identified as bottlenecks.
Figure 6:
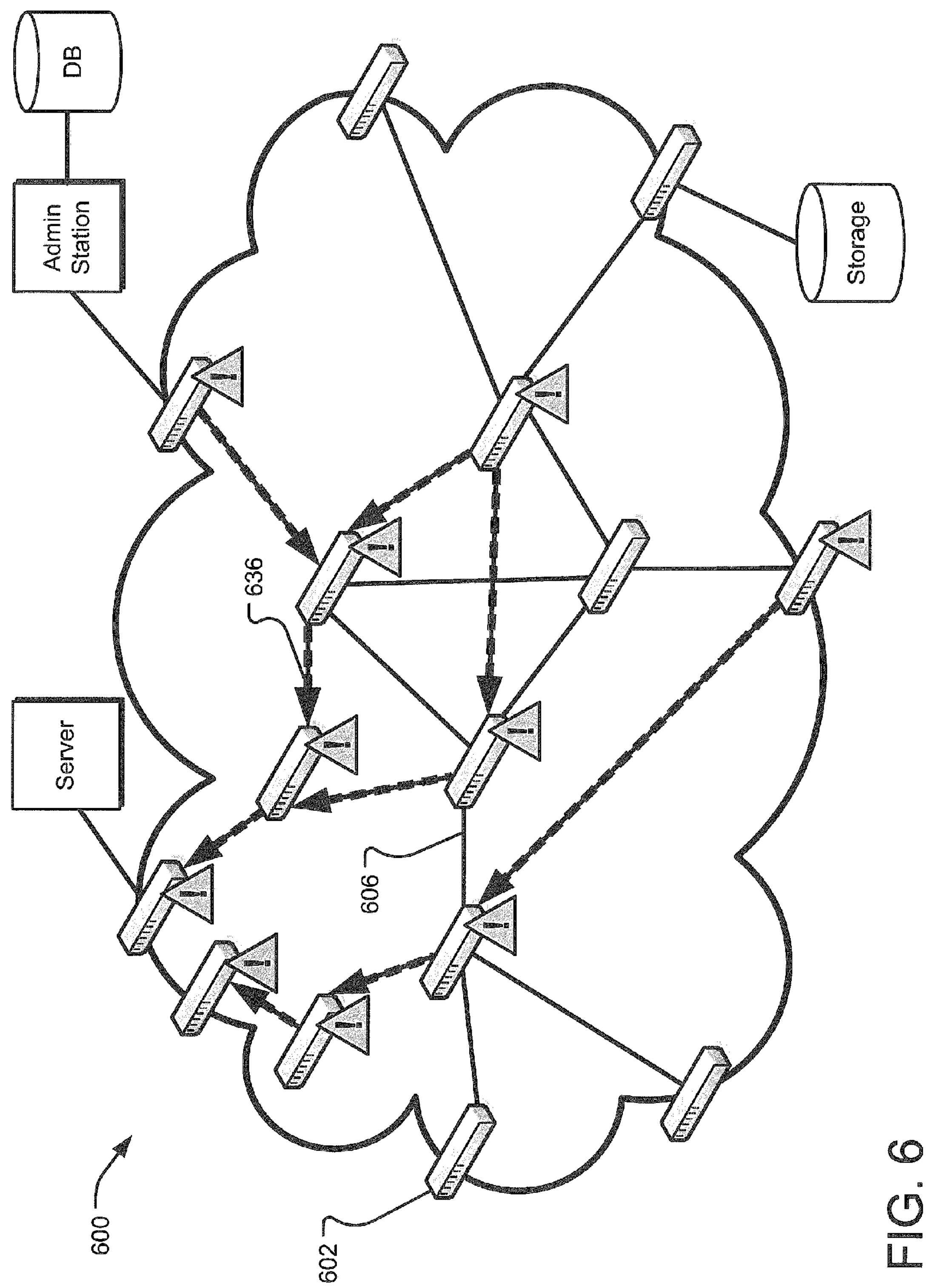
FIG. 6 illustrates an example network of switches interconnected by links with dashed arrows indicating back pressure overlaid on the network.

FIG. 2 illustrates an example network 200 of switches, such as switch 202, interconnected by links, such as link 206, with some switches 208 identified as having bottlenecked ports (designated by a triangular symbol containing an exclamation point). Detection of which switches 202 within the network 200 are switches 208 that contain bottlenecked ports is an initial step in resolving the bottlenecks and making provisioning decisions. It should be understood that marking a switch with the triangular symbol indicates that at least one port on the switch is bottlenecked. At the point illustrated in FIG. 2, decisions about which bottlenecks are primary and which bottlenecks are dependent have not yet been made. As a subsequent step, back pressure caused by the bottlenecked ports is mapped onto the network 200 as shown in FIG. 6.

Figure 3:
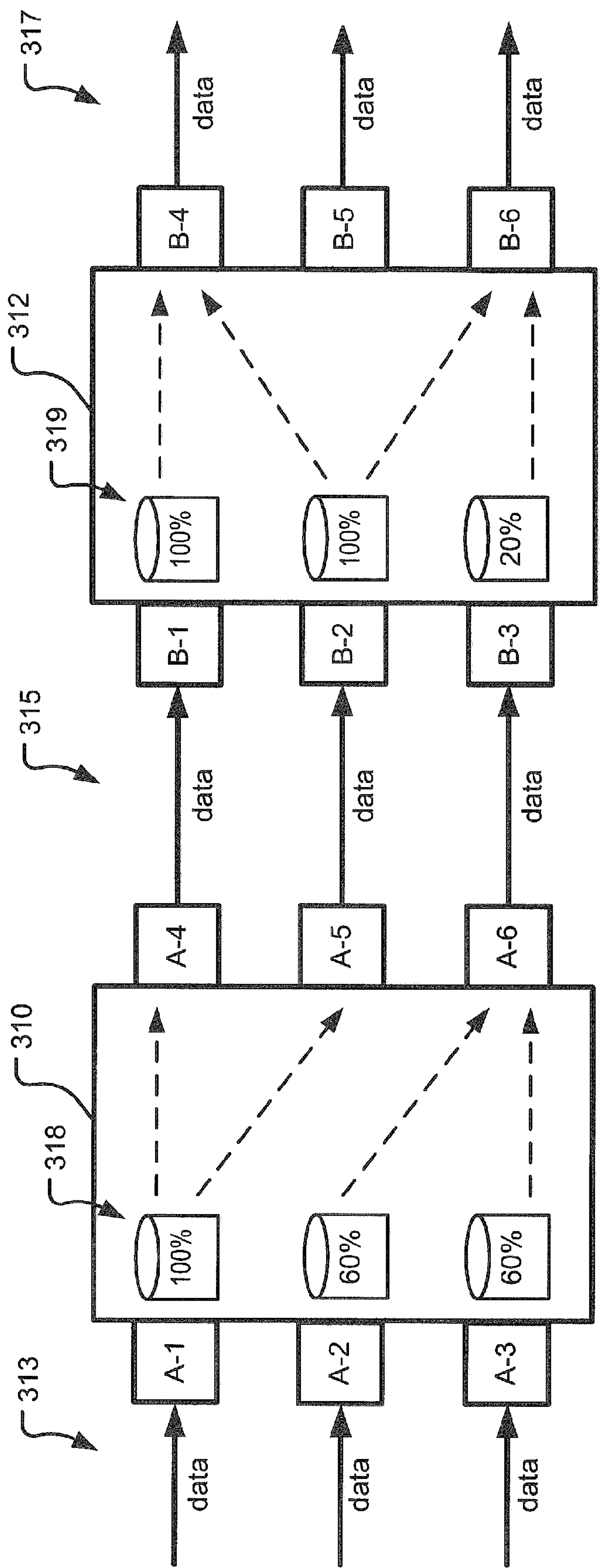
FIG. 3 illustrates two example connected switching elements.

FIG. 3 illustrates two example connected switching elements 310 and 312 (e.g., switches). In this example, data is shown flowing from left to right. Switch 310 includes ingress ports A-1, A-2, and A-3, each connected to one of links 313, and egress ports A-4, A-5, and A-6, each connected to one of links 315. Switch 312 includes ingress ports B-1, B-2, and B-3, each connected to one of links 315, and egress ports B-4, B-5, and B-6, each connected to one of links 317. Also shown are receive buffers 318 and 319, wherein each receive buffer is conceptually located at an ingress port connected to each link 313 and 315 and holds packets received at each switching element 310 and 312, respectively. Each link of the links 313, 315, and 317 may be embodied by one or more physical communication links, virtual representations of the physical links, or some combination thereof.

Within either of the switching elements 310, 312, when an egress port is fed packets from one or more ingress ports faster than the egress port is able to transmit them, the receive buffer for the ingress port fills up with packets. When one or more of the receive buffers feeding the egress port are full with more packets waiting to arrive, the egress port of the switch becomes a bottleneck. This occurs, among other possible reasons, because the egress port is not getting enough credits back to transmit more packets or because the egress port is not fast enough to transmit at the rate it is being fed packets from one or more ingress ports. In some implementations, the link connected to a bottlenecked egress port is also deemed a "bottlenecked link."

For example, as shown in FIG. 3, packets received at ingress ports B-1 and B-2 are both forwarded to the egress port B-4. If the egress port B-4 cannot transmit packets fast enough to handle the traffic from the ingress ports B-1 and B-2, then packets get backed up at both of the ingress ports B-1 and B-2. In the example, the receive buffers of both ingress ports are full, as indicated by the 100% designations on the receive buffers 319 associated with ingress ports B-1 and B-2, and it is assumed that other packets are being held off from arriving in these buffers. As such, an egress port (such as B-4) of a switch becomes a bottleneck because the ingress ports B-1 and B-2 that are feeding the egress port B-4 are also backed up. This back up condition propagates further upstream with respect to traffic and is referred to as "back pressure". Accordingly, back pressure spreads upstream along a reverse direction to traffic flow, turning other upstream egress ports into bottlenecks. The spread of bottlenecks within the network can continue to spread upstream as back pressure to the source of the data flow (e.g., a point where packets enter the network or are created within the network).

Ports on a switch may be bidirectional, as is the case in Fibre Channel ports. It should be understood that a port may be a bottleneck for traffic flowing on one direction without necessarily being involved in bottleneck condition or back pressure system for traffic flowing in the other direction.

An example of this back pressure concept over multiple switches is also illustrated in FIG. 3. Assume that the egress port B-4 of the switching element 312 becomes a bottleneck. Because the packet rate exiting port B-4 is too slow, packets back up in receive buffers 319 for the ingress ports B-1 and B-2 because ingress ports B-1 and B-2 feed egress port B-4. Accordingly, this circumstance causes the ingress ports B-1 and B-2 to back up. Further, because the egress ports A-4 and A-5 of the switching element 310 connect to the ingress ports B-1 and B-2 of switching element 312 by the links 315, the egress ports A-4 and A-5 can become bottlenecks as well. Similarly, if the packet rate exiting the egress ports A-4 and A-5 is too slow, packets back up in receive buffer 318 for ingress port A-1 which feeds ports A-4 and A-5, and can cause the ingress port A-1 to backup as well, as shown by the 100% designation on the receive buffer associated with the ingress port A-1.

Given this context, back pressure mapping can be employed to distinguish primary bottlenecks from dependent bottlenecks within a network. According to one implementation, a port is a primary bottleneck if it is (a) an egress port on an edge switch that is bottlenecked due to a slow-draining destination node to which it is connected, (b) an egress port on an internal network switch or edge switch that is bottlenecked because the egress port does not have enough credits for the bandwidth-delay product of the link to which it is connected, or (c) an egress port on an internal network switch or edge switch that is bottlenecked due to congestion on the link to which it is connected. A congestion condition occurs when the bandwidth of the link to which the port is connected is oversubscribed—there is a demand for more than 100% of the link's bandwidth. In contrast to a primary bottleneck, a port is a dependent bottleneck if it is bottlenecked due to effects of a downstream primary bottleneck (i.e., downstream with respect to traffic). Remedying a primary bottleneck often remedies the other bottlenecks that are dependent on it.

It should also be understood that bottlenecks may also be introduced by faults in a switch, a link, or a node that slow traffic flow in the network. A fault may result in what appears to be a slow drain bottleneck or a congestion bottleneck. As such, the described technology can be employed to detect and identify faults in a network or its connected nodes.

Furthermore, this description focuses on bottlenecks being detected at and/or attributed to egress ports of a switch. In an alternative implementation, bottlenecks may be detected at and/or attributed to ingress ports. In addition, alternative implementations may implement switches using transmit buffers instead of or in addition to receive buffers.

Referring to FIG. 3, the bottlenecked ports A-4 and A-5 are dependent on the bottlenecked port B-4. Therefore, remedying the bottleneck at port B-4 is likely to remedy the upstream bottlenecks at ports A-4 and A-5. Further, the bottleneck at port B-4 may itself be primary or dependent based on whether it is a root cause of back pressure in the network or some other downstream port is a root cause of the back pressure. The dependencies of various bottlenecks result in back pressure flow upstream with respect to traffic flow that can be represented in a back pressure map.

FIG. 4 depicts example classifications 400 of bottlenecks according to the presently disclosed technology. Disclosed herein are three ways of classifying bottlenecks: (a) classification based on conditions in the link causing the bottleneck (e.g., slow-drain and congestion), (b) classification based on a distance from the root cause of the bottleneck (e.g., primary and dependent), and (c) classification based on bottleneck location (e.g., network and edge, wherein "network" refers to internal network switches and "edge" refers to edge switches). However, other methods may also be used to classify bottlenecks. These three classifications give eight potential combinations as shown in FIG. 4. Cells in the table are marked with an "x" in FIG. 4 illustrating classification combinations that are recognized under the example classification scheme. Other combinations may also be defined.

Network bottlenecks refer to bottlenecks that are within the network and not at the edge of the network, while edge bottlenecks refer to bottlenecks in a switch that connects the network to a node external to the network (e.g., between F_Ports and N_Ports). Congestion bottlenecks are primary bottlenecks by definition and may arise anywhere within the network, including on the edge of the network. Slow-drain bottlenecks are primary when they arise on the network edge, and may be either primary or dependent when they arise within the network (i.e., not on the edge).

Unlike the flow of traffic, the flow of back pressure is not readily observable using simple counters that count the number of packets transmitted over a link. Back pressure systems can lurk invisibly in a network. Thus a back pressure mapping obtained from detected bottlenecks is a useful tool in performing network healing operations and making provisioning decisions and/or recommendations.

There is at least one exception to the reasoning described above with respect to FIG. 4, although it does not change the example classification 400. In addition to edge and internal network switches, some networks are also coupled to out-of-network extension/interoperability devices (e.g., access gateways, in one implementation) that present Fibre Channel connections to one or more servers and allow the servers to connect to a network without using an additional switch domain. An access gateway, for example, allows interoperability between bladed SAN switch of one vendor and fixed-port and director-level switches from other vendors. The access gateway uses standards-based N_Port ID Virtualization (NPIV) technology to virtualize multiple SAN devices for interoperability and scalability. In one implementation, an access gateway presents multiple F_PORTs to nodes outside the network and presents one or more N_PORTs to F_PORTs of an edge switch of a network. In this way, multiple servers can be connected to the network without assigning a new switch domain to the access gateway connected to those servers.

An access gateway may also include a bottlenecked port. Nevertheless, the classification of bottlenecks within the network is still reflected by the table in FIG. 4. If the edge switch to which the access gateway is connected is a bottleneck, then "healing" (as discussed in more detail later in this application) the bottlenecked port in the edge switch may involve also remediating one or more bottlenecks in the access gateway. Such remediation is not described in detail in this application but should follow directly from the healing described with respect to bottlenecked ports in edge and internal network switches described herein.

Figure 5:
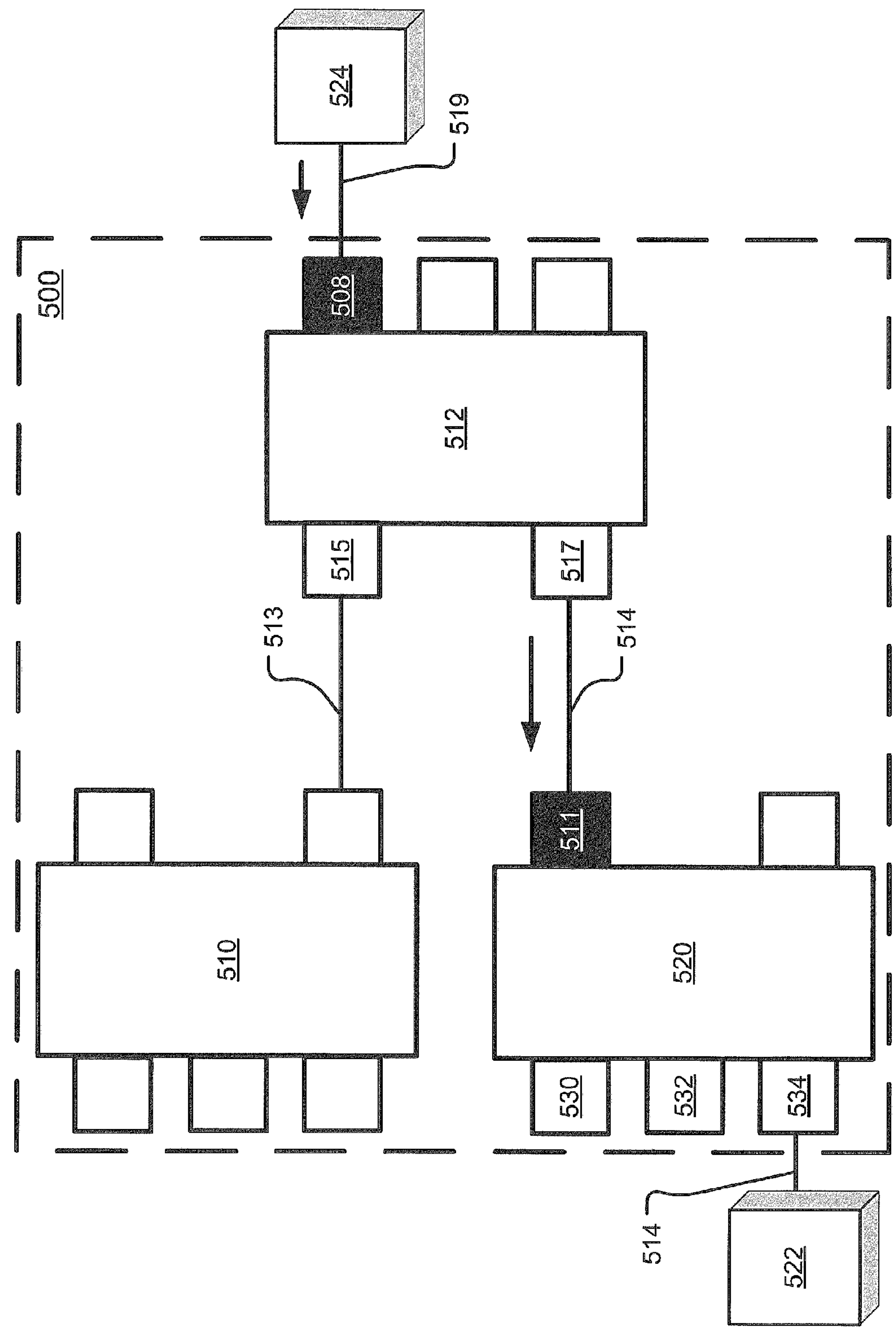
FIG. 5 illustrates a very simplified example network of switches showing two bottlenecked egress ports in a back pressure system.

FIG. 5 illustrates a very simplified example network 500 of switches showing two bottlenecked egress ports 508 and 511 in a back pressure system. For the purposes of illustration, this example network 500 is simplified from an actual network that would often contain many more switching elements, nodes, and links. In this example, each of switching elements 510, 512, and 520 are equipped with five ports. Switching elements 512 and 520 each have one darkened egress port (508 and 511) indicating that the port has been identified as a bottleneck.

As an initial operation (referred to as a bottleneck identification operation), each bottlenecked port is identified by bottleneck detection logic executed by firmware in one or more switches or an administrative system connected to the network 500. In one implementation, the bottleneck detection logic queries controller circuitry in each switching element 510, 512, and 520. In response, the controller circuitry identifies any ingress port having a receive buffer that is exhibiting an "overfull" condition (e.g., 100% of its records are filled with received packets and more received packets are waiting to arrive). For example, if the controller circuitry identifies the ingress port 517 as having a full receive buffer over a prescribed period of time, then this state suggests that the ingress port 517 is receiving packets faster than they can be transmitted out of the switch 512 by the egress ports that are feed by the ingress port 517.

In one implementation, the network controller may directly identify an "overfull" condition and identify the egress port(s) that are affected by the back up condition. In other implementations, the "overfull" condition and the contributing egress port(s) are identified by approximation. If the network controller does not support such queries, an approximation can be obtained using zoning and routing information. For example, using zoning information, one can start with an assumption that ingress ports on a switch could be feeding all of the egress ports on the switch. However, if a server and storage device connected to an ingress/egress port pair are not in the same zone, then the ingress/egress port pair can be eliminated as a part of the same back pressure system because no traffic flows between the separately zoned server and storage device. Further, using routing information, if no route exists in the switches routing table that would transmit packets between an ingress/egress port pair, then the ingress/egress port pair can be eliminated as a part of the same back pressure system. As such, using the zoning and routing information can allow the back pressure mapping logic to narrow the ingress/egress port pairs in the switch that can be part of the same back pressure system. These approximations can identify both the bottlenecked egress ports and the associated ingress ports, albeit with some uncertainty (e.g., some ingress/egress port pairs may be identified as part of the same back pressure system when they are not). Regardless of the method used to identify the upstream ingress ports in the switch, relative to a bottlenecked egress port, the identified ingress ports are added to the bottleneck record (e.g., not as bottlenecks but as feeding a bottlenecked egress port) along with the identities of the communication links connected to the identified ingress ports It should be understood that this implementation is based on a switching element employing receive buffers. However, analogous configurations can be employed in switching elements having transmit buffers instead of receive buffers or having combinations of transmit buffers and receive buffers.

Regardless of the buffer configuration, if the bottleneck identification operation identifies one or more bottleneck egress ports in the network 500, then the results of the operation are stored in a bottleneck record in a memory accessible by the firmware or administrative logic. In one implementation, the results include without limitation the identity of the bottlenecked egress port, the communications link connected at the bottlenecked port, etc.

Back pressure mapping involves identifying a sequence of bottlenecks that progress upstream with respect to traffic from a primary bottleneck and addresses portions of the back pressure system that lie both internal to network switches and external to network switches. A back pressure mapping operation (e.g., executed by back pressure mapping logic in firmware or administration logic) then maps back pressure upstream (i.e., in the opposite direction of the monitored data traffic) between bottlenecked egress ports.

A back pressure graph data structure (e.g., representing a directed graph) is created in memory to map the back pressure through one or more switches. In one implementation, a topology definition, identifying switches, inter-switch links, and connected nodes, is used to develop the back pressure graph. An example back pressure graph data structure may consist of nodes and arcs, where each arc connects two nodes. In one implementation, the back pressure graph data structure represents a directed graph, which means the arc has a "head" and a "tail" to encode directional information. Each node represents a bottlenecked port, and each arc represents back pressure flow, upstream with respect to traffic flow, along inter-switch links (ISLs) or intra-switch links (e.g., reflecting traffic within a network controller chip of a switch). If intra-switch back pressure flow information is not available, nodes represent switches and arcs represent ISLs. In alternative implementations, a back pressure graph data structure may be implemented as an array of linked lists, one linked list for each node and one linked list element for each arc.

In one implementation, the portion of a back pressure system that lies within a switch can be determined using the results of the bottleneck identification operation. For example, in one implementation, by querying the network controller to identify the ingress ports of the switch having "overfull" receive buffers and the egress ports fed by those receive buffers, the firmware or administrative logic can identify the backed-up ingress ports within the switch that are upstream from the bottlenecked egress port.

The portion of a back pressure system that lies external to a switch (e.g., between two switches or between an edge switch and a host) can be determined by identifying in the back pressure graph a link that connects a bottlenecked egress port of one switch to an ingress port of another switch. The portion of a back pressure system that lies external to individual switches is identified by determining that a port is a bottlenecked port. When a port is bottlenecked, back pressure enters the port from outside the network controller (e.g., the switch ASIC). Thus, the link attached to the bottlenecked port also becomes an arch in the back pressure graph. The two ports at the endports of the link will be referenced as nodes in the back pressure graph, and the link joining them will become a directed arc in the back pressure graph. Alternatively, the switches containing the ports may be nodes in the back pressure graph.

Once the back pressure links associated with each identified bottleneck are determined in the back pressure graph, the administrative logic decomposes the back pressure graph into independent back pressure systems. More detail on independent back pressure systems is provided with regard to FIG. 8. The back pressure graph can be represented as a directed graph built using the topology graph as a template. The back pressure graph may contain one or more independent back pressure systems in the form of sub-graphs that are not connected with one another by any arcs. These back pressure systems are identified by searching the back pressure graph for connected subgraphs. In one implementation, the firmware or administrative logic runs an undirected graph traversal mechanism (e.g., a depth-first search, a breadth-first search, etc.) on the directed back pressure graph repeatedly until all switches and hosts in the back pressure graph have been visited and classified into an independent back pressure system. The back pressure system to which each bottlenecked port belongs is marked within the back pressure graph. For example, each node can include a back pressure system field identifying the independent back pressure system attributed to the associated bottlenecked port.

Having identified one or more independent back pressure systems, each of the bottleneck records in each independent back pressure system is evaluated to designate it as either a primary bottleneck or a dependent bottleneck. In one implementation, to designate between a primary bottlenecked port and a dependent bottlenecked port, back pressure system identifier logic can examine the degree of each node in the back pressure graph. Node degree represents the number of arcs associated with the node. For a directed graph, such as the example back pressure graph described above, the "indegree" is the number of arcs "entering" the node (based on the directional information) and the "outdegree" is the number of arcs "leaving" the node (based on the directional information). A primary bottlenecked port is a node having at least an indegree of zero and an outdegree greater than zero. A secondary bottlenecked port is a node having at least an indegree that is greater than zero.

Applying this rule to the network 500 of FIG. 5, the bottlenecked egress port 508 is a primary bottleneck, as there are no downstream bottlenecks (i.e., downstream with respect to traffic) to the bottlenecked egress port 508 identified in the independent back pressure system. Further, the switching element 520 includes a dependent bottleneck at egress port 511, which is dependent on the primary bottlenecked egress port 508. In more complex network arrangements, multiple primary bottlenecked ports may be identified throughout the network, each giving rise to its own system of upstream dependent bottlenecked ports.

Returning to FIG. 5, an example back pressure graph contains nodes for bottlenecked ports 508 and 511, and a provisional node for device 524, known to be outside the network. The back pressure graph would also contain a back pressure arc (representing a link) directed from the node representing port 508 to the node representing port 511. The other non-bottlenecked ports and links are represented in a network topology but would not be represented in the back pressure graph itself. Applying the rule for classifying a node as either a primary or dependent bottleneck, bottleneck detection logic would identify port 511 as a dependent bottleneck and port 508 as a primary bottleneck.

FIG. 6 illustrates an example network 600 of switches interconnected by links with dashed arrows indicating back pressure overlaid on the network 600. The graphical mapping of the back pressure arrows of FIG. 6 is accomplished using the back pressure graph described with regard to FIG. 5. However, FIG. 6 illustrates a more complex network 600 containing multiple back pressure systems. Although the back pressure graph is implemented on a port-basis, the back pressure arrows in FIG. 6 are drawn more generally without depicting individual ports to represent a back pressure system. Further, it should be understood that different ports on the same switch could be in different back pressure systems.

Figure 7:
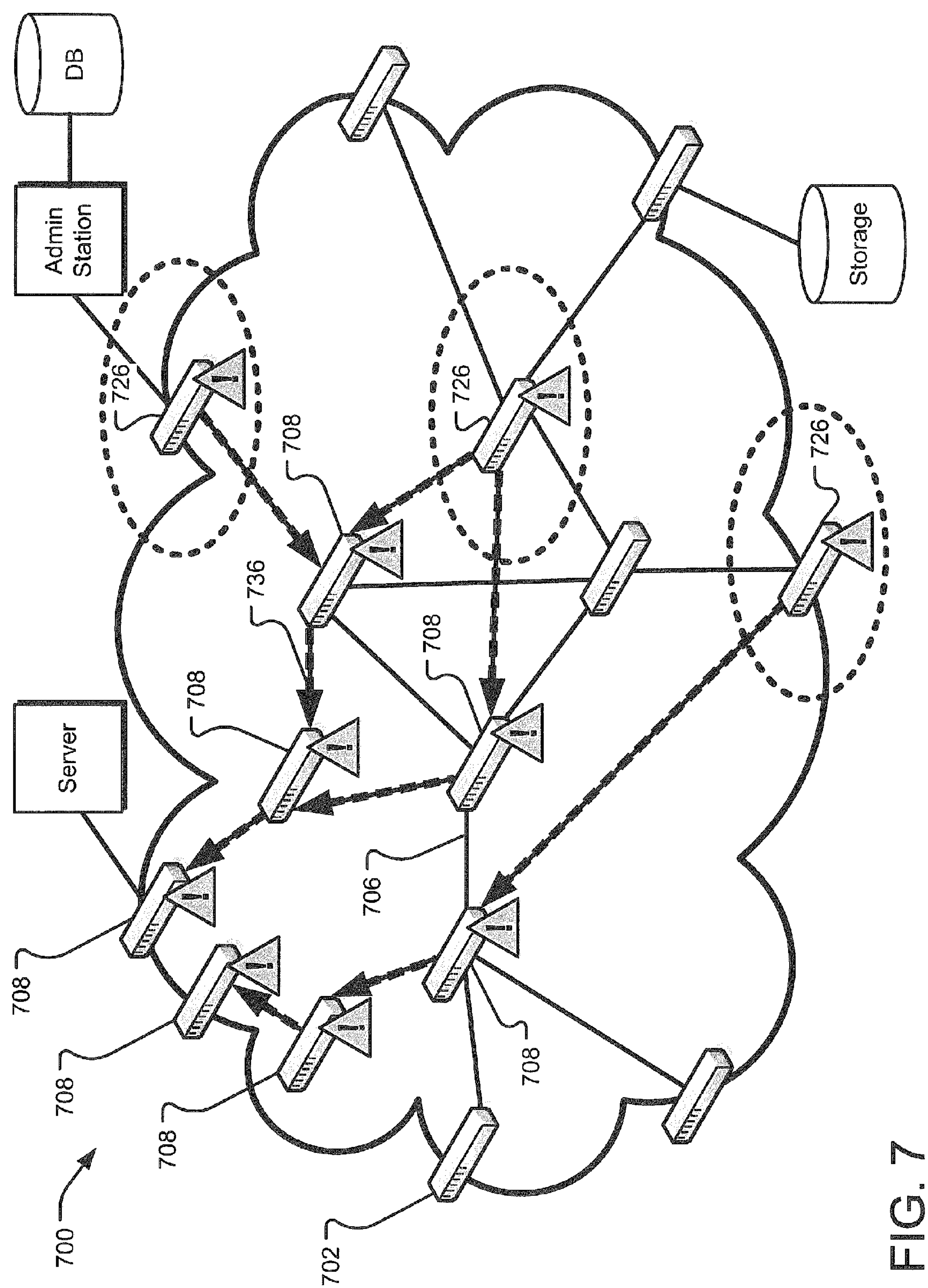
FIG. 7 illustrates an example network of switches interconnected by links with some switches identified as primary bottlenecks.

FIG. 7 illustrates an example network 700 of switches, such as switch 702, interconnected by links, such as inter-switch link 706, with some switches identified as primary bottlenecks. Multiple switches having bottlenecked ports 708 are identified. Back pressure is depicted with dashed arrows, such as dashed arrow 736. Identification of the primary bottlenecks 726 of FIG. 7 is also accomplished in the same manner as that used to identify the primary bottlenecks of FIG. 5. However, FIG. 7 illustrates a more complex network 700 containing multiple primary bottlenecks 726. Bottlenecks that do not have any incoming back pressure arrows (e.g., the downstream references are void) and one or more outgoing back pressure arrows are identified as primary bottlenecks. In FIG. 7, three of bottlenecks 726 identified by a triangular symbol containing an exclamation point are circled by a dashed line, identifying them as primary bottlenecks.

Figure 8:
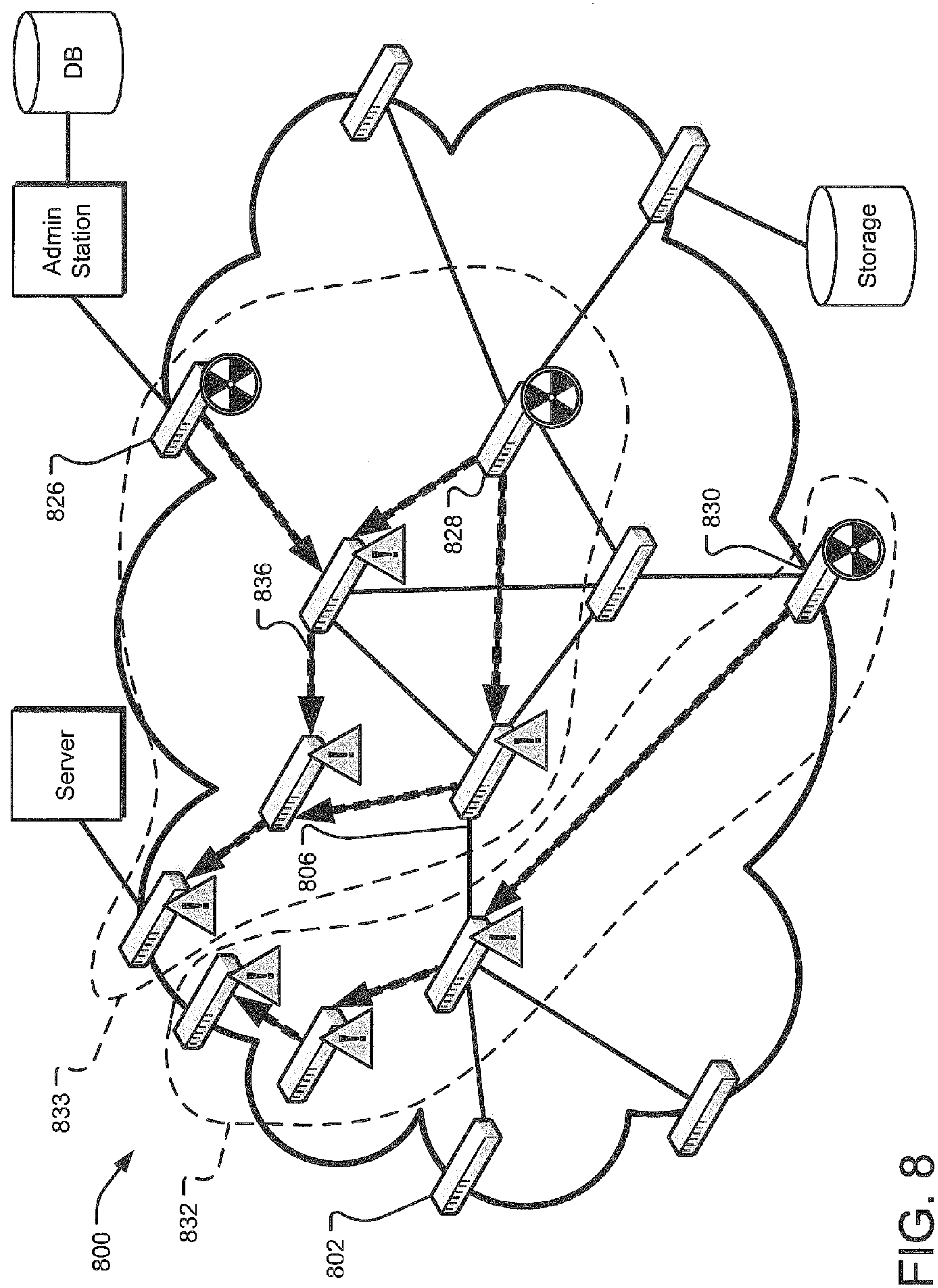
FIG. 8 illustrates an example network of switches interconnected by links with two independent back pressure systems.

FIG. 8 illustrates an example network 800 of switches, such as switch 802 interconnected by links, such as inter-switch link 806 with two independent back pressure systems 832, 833. In networks 800 with multiple primary bottlenecks 826, 828, 830 (marked with a black and white sectioned disk icon), there may be more than one independent back pressure system. Independent back pressure systems have no back pressure arrows 836 that interact with another back pressure system. These independent back pressure systems are detected using a graph traversal algorithm and are identified in FIG. 8 by a dashed boundary line around bottlenecks systems 832, 833.

In FIG. 8, a first boundary line is drawn around the primary bottleneck 830 and bottlenecks dependent from primary bottleneck 830 to identify a first back pressure system 832. Then, a second boundary line is drawn around primary bottleneck 826, primary bottleneck 828, and bottlenecks dependent from primary bottlenecks 826 and primary bottleneck 828 to identify a second back pressure system 833. Two or more different primary bottlenecked ports may be included in a single independent back pressure system. Accordingly, two independent back pressure systems 832, 833 are identified within the network 800.

Once the back pressure mapping has been completed and all primary bottlenecks have been identified, network healing operations may be conducted to resolve the bottlenecks. Knowledge of which primary bottlenecks form a part of which independent back pressure systems allows resources to be allocated to resolving back pressure systems with only one primary bottleneck first. In other implementations, knowledge of which primary bottlenecks form a part of which back pressure systems allow resources to be allocated to resolving primary bottlenecks in more critical back pressure systems first.

Figure 9:
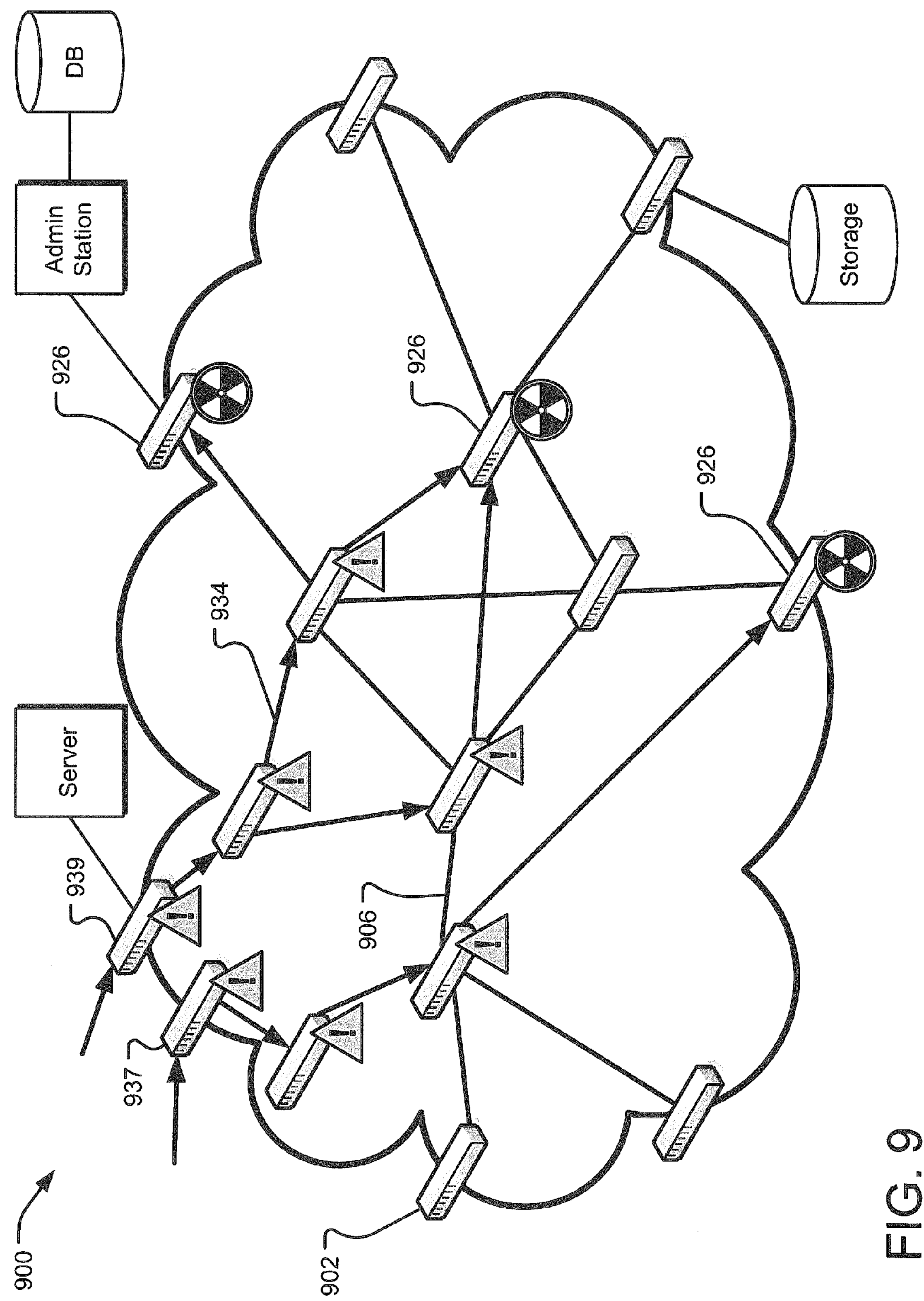
FIG. 9 illustrates an example network of switches interconnected by links with directional arrows representing traffic flow over links connected to bottlenecked ports.

FIG. 9 illustrates an example network 900 of switches, such as switch 902, interconnected by links 906 with one-way traffic flow arrows, such as traffic flow arrow 934, representing traffic flowing over links connected in a back pressure system. The traffic flow arrows 934 are used to identify source switches 937, 939 for data packets that are bottlenecked at primary bottlenecks 926. Identification of a source switch is made by traversing the upstream bottlenecked node(s) in a back pressure system. In one implementation, each switch can be queried to identify the traffic flows that are sending the most traffic through the bottlenecked port. With this information, the back pressure mapping logic can follow the back pressure links back to the source switch. One or more switches containing the upstream-most bottlenecked egress port in a back pressure system are deemed the source switches. Referring to FIG. 9, switching element 937 is identified as the upstream-most bottleneck (or source switch) for the first back pressure system 832 of FIG. 8. Switching element 939 is identified as the source switch for the second back pressure system 833 of FIG. 8. Therefore, the backed up ingress ports at source switches 937, 939 are the source ports. While FIG. 9 does not illustrate multiple ports on each switch 902, a more detailed back pressure diagram would illustrate each individual port on each switch 902 and specifically identify source ports within each source switch 937, 939.

Figure 10:
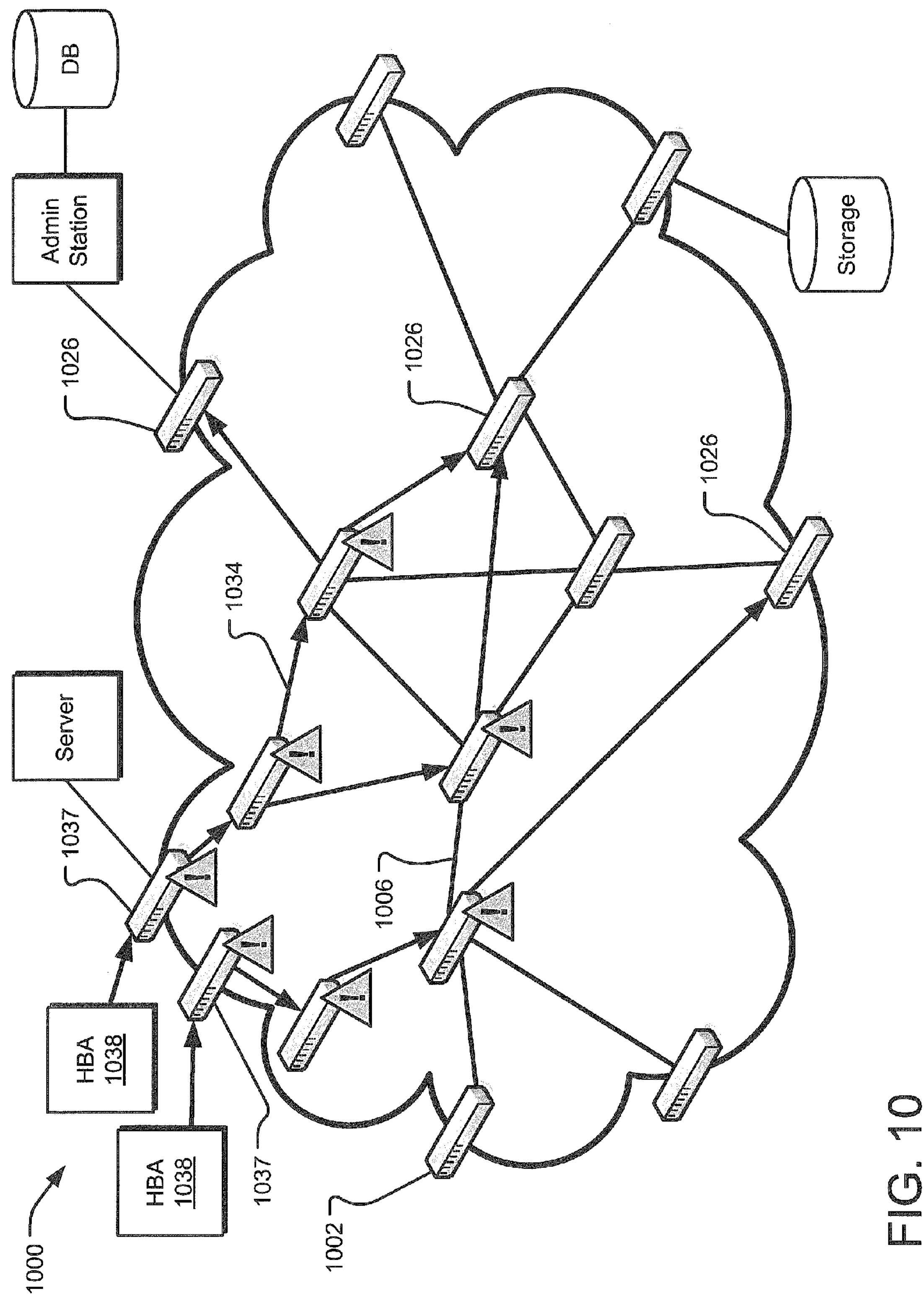
FIG. 10 illustrates an example network of switches interconnected by links with packet rate limiters applied to F_PORTs on source switches.

FIG. 10 illustrates an example network 1000 of network switches, such as switch 1002, interconnected by links, such as inter-switch link 1006, with packet rate limiter devices 1038 applied to source ports on source switches 1037. Once the source ports are identified, rate limiting host bus adapters (HBAs) 1038 or other rate limiting circuitry or devices, whether inside or outside the network, may be applied to limit packet traffic processed by the source ports. While the packet rate limiter devices 1038 are shown separate from the source switches 1037 and source nodes for purposes of illustration in FIG. 10, the HBAs and/or other packet rate limiter circuitry or devices 1038 may be incorporated into the switches 1037 or the source nodes themselves. In one implementation, the rate limiting circuitry or devices 1038 slow the transmission rate of the source node (e.g., by reducing the credits available to the source node within each credit window).

It should be understood that the rate limiting circuitry may implement an incremental enforcing and relaxing of rate limiting in a type of feedback loop. For example, rather than limiting the transmission rate of a node or switch directly to some optimal rate, the rate limiting circuitry may reduce the transmission to an incrementally lower rate and allow the system to determine whether the primary bottleneck has been resolved. If not, the rate limiting circuitry again reduces the rate by some incremental amount in the next round of bottleneck remediation, repeating until the bottleneck is resolved. As traffic and other characteristics within the network 1000 change over time, at some point, the rate limiting device may relax its limiting effect over time in attempts to return to a higher performance state within the network.

Alternatively, traffic at source switches may be re-routed to avoid bottlenecked ports. In this manner, high volume traffic from a source node can be re-allocated to other switches, links and/or ports, thereby reducing the traffic over the original back pressure system.

In yet another alternative, additional bandwidth may be added to congested links, particularly a link at a primary bottleneck port. For example, if a congested link is a trunk link, additional individual links can be added to the trunk to increase the bandwidth through the trunk, thereby reducing congestion in the trunk link.

These and other congestion remediation options may reduce the packet load through links connected to bottlenecked ports all the way to the primary bottlenecks 1026. Other methods and systems for limiting packet rates may also be employed. Referring specifically to FIG. 10, use of the packet rate limiter devices 1038 reduces packet rates through previously links connected to bottlenecked ports (illustrated by arrows 1034) to previously bottlenecks 1026, thereby remediating the bottlenecks.

Figure 11:
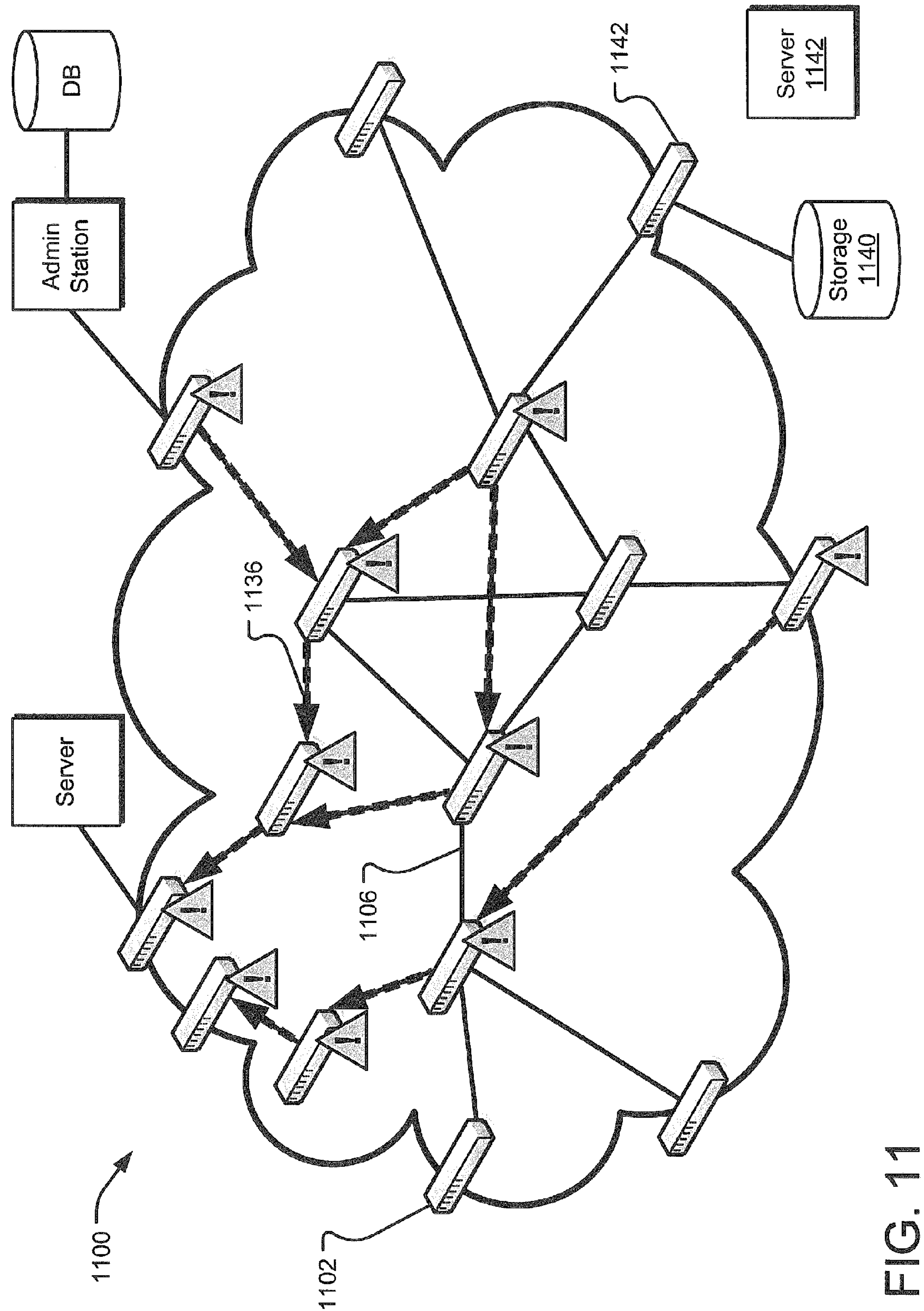
FIG. 11 illustrates an example network with dashed arrows indicating back pressure, a first node connected to the network, and a second node that needs to connect to the first node through the network.

FIG. 11 illustrates an example network 1100 with dashed arrows indicating back pressure 1136, a first node (a storage node 1140) connected to the network 1100, and a second node (a server node 1142) that needs to connect to the storage 1140 through the network 1100. Once back pressure mapping has been completed and primary bottlenecks have been identified, provisioning decisions or recommendations may be made to avoid or reduce traffic through bottlenecks. Similar to FIG. 6, a network 1100 of network switches 1102 interconnected by links 1106 is shown with arrows indicating back pressure 1136 overlaid on the network 1100.

The storage node 1140 is connected to the network 1100 via a network edge switch 1144. The server node 1142 requires a data path through the network 1100 to send and/or receive data packets to/from the storage node 1140. Provisioning refers to deciding where the server node 1142 should be connected to the network 1100 so that data packets transmitted between the storage node 1140 and the server node 1142 do not pass though any links connected to bottlenecked ports. If no path exists through the network 1100 without any links connected to bottlenecked ports, the server node 1142 should be connected to the network 1100 so that data packets transmitted between the storage node 1140 and the server node 1142 pass through the fewest number of bottlenecks and/or the least bottlenecked path. By performing a back pressure analysis on the network 1100 to determine where to connect the second node 1142, an improved determination about where to connect the server node 1142 can be made, thereby improving the "provisioning" of the network 1100.

In some implementations, two nodes (e.g., both a server and a storage node) may be added to the network 1100. In this case, the provisioning feature of the described technology may select/suggest ports to which both devices may be connected to the network 1100. For example, if an administrator wishes to connect both a server and a storage node to the network 1100, the provisioning logic can select a series of ports on edge switches and determine a bottleneck-free route (or a route with minimal bottlenecks) through the network 1100 through a series of trial-and-error analyses relative to these ports. When the provisioning logic determines an acceptable pair of ingress/egress ports, the provisioning logic can suggest the appropriate ports to which the new nodes should be connected (e.g., blinking lights associated with the ports, identifying said ports on an administrative station display screen, etc.).

Figure 12:
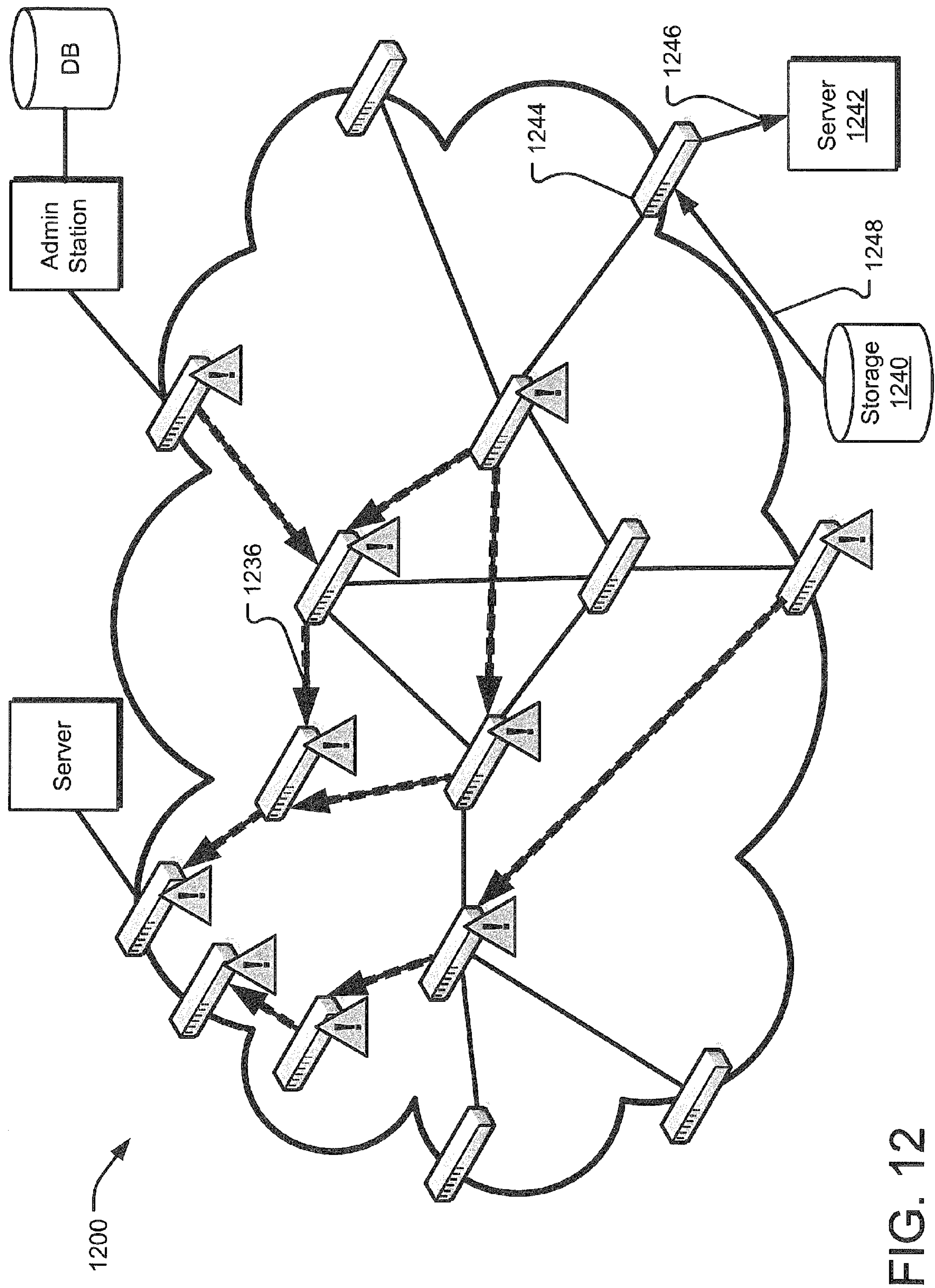
FIG. 12 illustrates an example network with dashed arrows indicating back pressure and thin one-way arrows indicating a first example bottleneck-free data path between a first node and a second node connected to the network.

FIG. 12 illustrates an example network 1200 with dashed arrows indicating back pressure 1236 and thin arrows indicating a first example bottleneck-free data link 1246 between a storage node 1240 and a server node 1242 connected to the network 1200. The implementation of FIG. 12 shows the second node 1242 connected to the same network edge switch 1244 as the first node 1240. In this implementation, the data link 1246 between the first node 1240 and the second node 1242, illustrated by the two-way arrows, only passes through one non-bottlenecked port in the network edge switch 1244 and thus avoids any links connected to bottlenecked ports in the network 1200. So long as the selected port in the network edge switch 1244 is not a bottlenecked port, the data links 1246 and 1248 are bottleneck-free.

Figure 13:
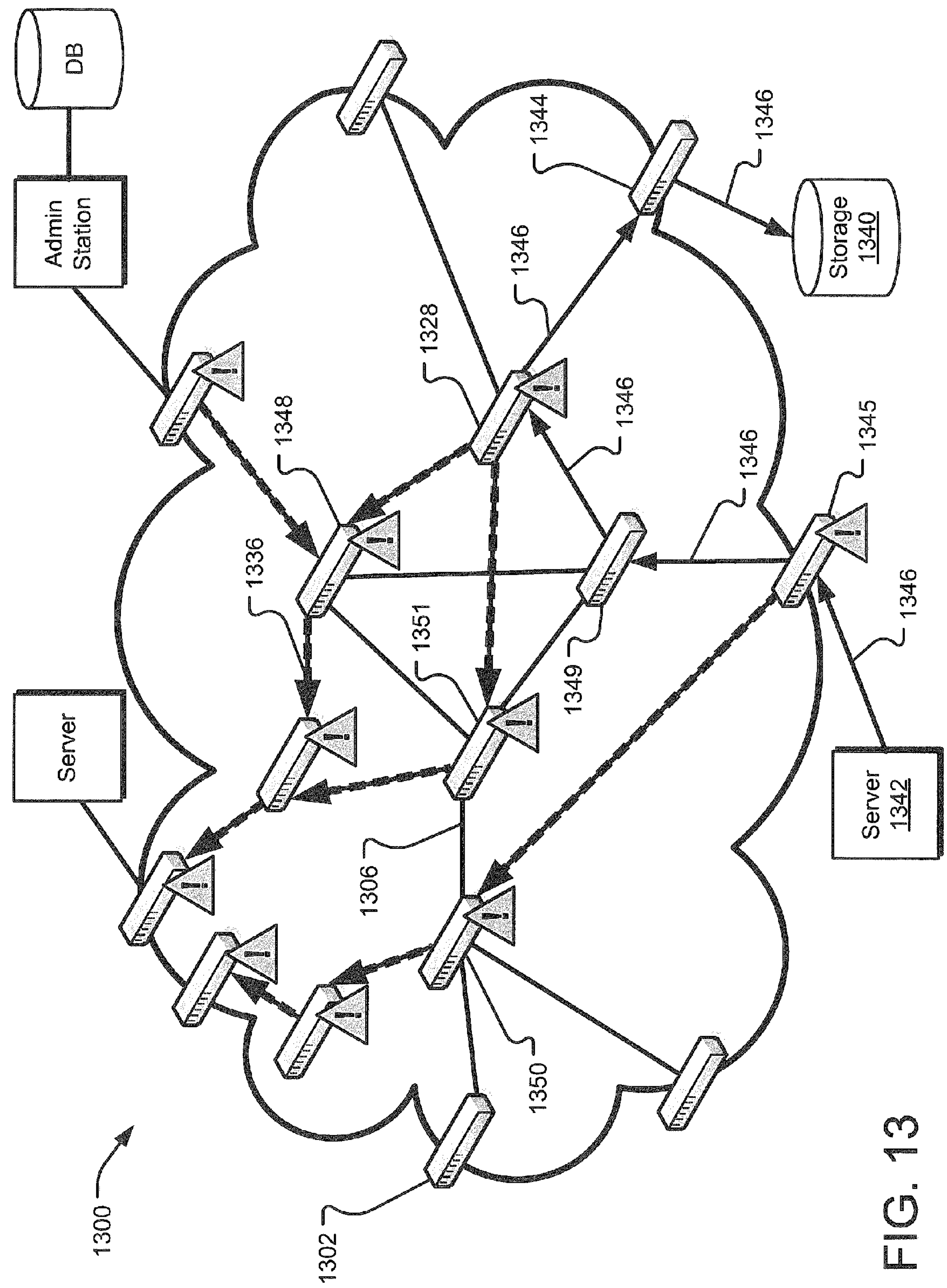
FIG. 13 illustrates an example network with dashed arrows indicating back pressure and thin one-way arrows indicating a second example bottleneck-free data path between a first node and a second node connected to the network.

FIG. 13 illustrates an example network 1300 with dashed arrows indicating back pressure 1336 and thin arrows indicating a second example bottleneck-free data link 1346 between a storage node 1340 and a server node 1342 connected to the network 1300. In some implementations, connecting the server node 1342 to the storage node 1340 using one network edge switch 1344 is not an available option. As an alternative, the server node 1342 may be connected to another network edge switch 1345 and still obtain a non-bottlenecked communications route. In the implementation of FIG. 13, the data links 1346 between the server node 1342 and the storage node 1340 are illustrated by the two-way arrows and the data link 1346 does not flow traffic through any bottlenecks (as illustrated by one-way back pressure arrows 1336).

Figure 14:
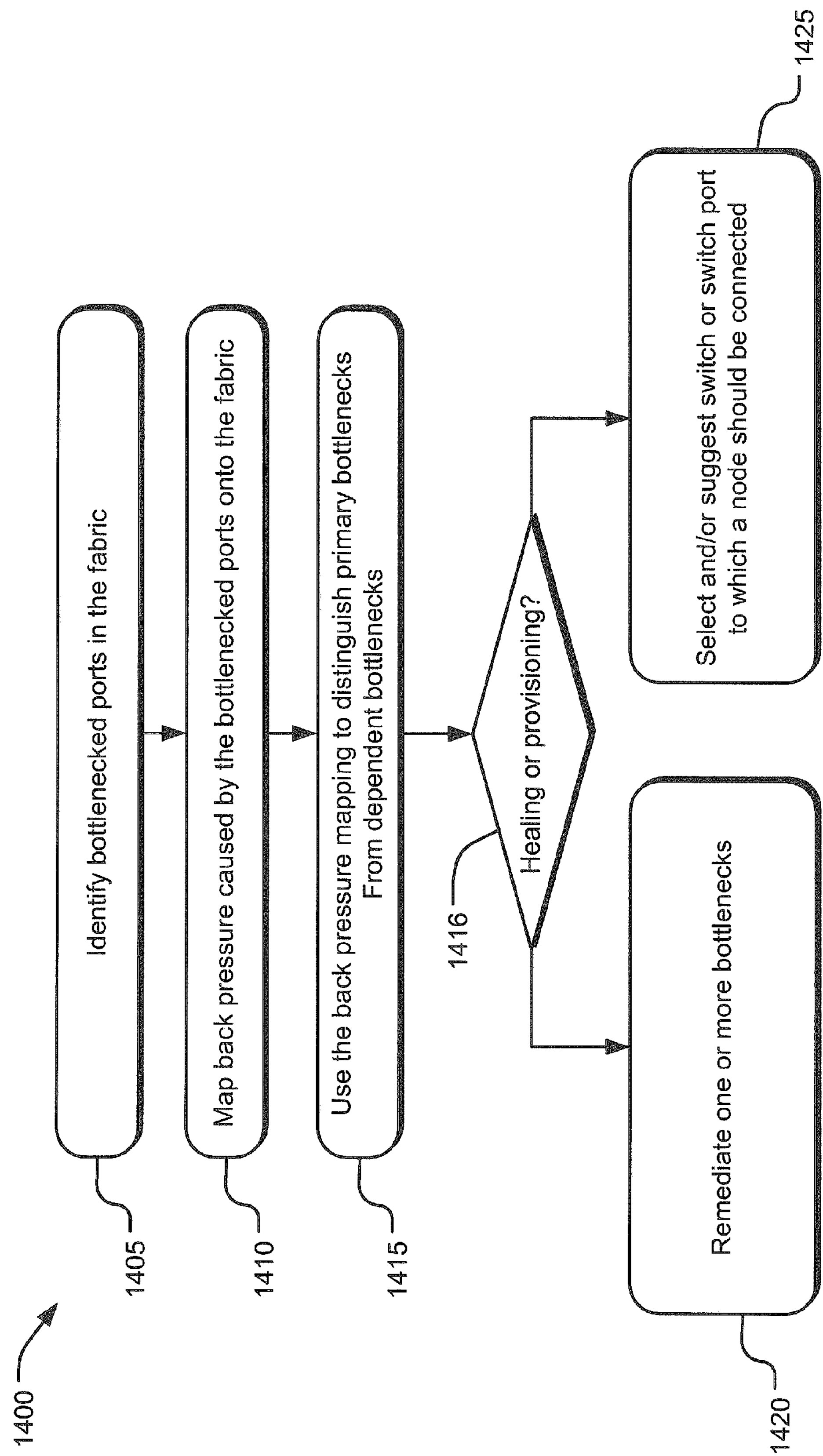
FIG. 14 illustrates example operations for mapping back pressure within a network, performing healing operations on the network, and making provisioning decisions based on the back pressure mapping.

FIG. 14 illustrates example operations 1400 for mapping back pressure within a network, performing healing operations on the network, and making provisioning decisions based on the back pressure mapping. An identification operation 1405 identifies bottlenecked ports within the network. A mapping operation 1410 maps back pressure within links connecting the bottlenecked ports of the network. A distinguishing operation 1415 distinguishes primary bottlenecks from dependent bottlenecks by identifying bottlenecked ports from where the back pressure originates. In one implementation, these operations are performed in accordance with the techniques described herein, particularly with regard to FIG. 5, although other techniques may also be employed.

With the primary bottlenecks identified, a decision operation 1416 determines whether the system has been instructed to perform a provisioning operation or a healing operation. If the system has been instructed to heal, a network healing operation 1420 may be performed that can reduce and/or eliminate the impact of the primary bottlenecks on performance of the network by reducing a data packet rate to the bottleneck or increasing the packet rate capacity of the bottleneck. For example, rate limiting can be applied at the source node or the edge switch to switch to which it is connected. Alternatively, additional bandwidth may be added, for example, by increasing the number of links in a communications trunk. Yet another alternative is to re-route the traffic from the source node to bypass the congested egress port.

If the system has been instructed to provision, an automatic provisioning operation 1425 make decisions and/or recommendations for the addition of new nodes. The provisioning decisions and/or recommendations connect new nodes to the network at locations that reduce the impact of bottlenecks on performance of the network. Provisioning decisions may require the new nodes to be connected to specific ports and/or network edge switches. In contrast, provisioning recommendations may suggest but not require ports for connecting new nodes. It should be understood that both healing and provisioning may be applied in combination and are not mutually exclusive.

Implementations of the presently disclosed technology relate to systems and methods for suggesting a switch port for adding a network node to a network (i.e. provisioning the network). More specifically, certain implementations analyze back pressure mapping, new node parameters, switch configuration, network topology information, topology constraints (e.g., separation between a server edge and a storage edge, knowledge of known nodes that will communicate with the new node, physical location of each switch), shortest path information, and routing patterns, and then select a switch port based on the analysis. A command is sent to a selected switch to activate an indicator on the selected port. New node parameters can be received from a user through a user interface. New node parameters may include without limitation new node type, maximum load, minimum load, time of maximum load, time of minimum load, and type of data associated with the new node. Switch configuration can be determined from buffer credit schemes and/or routing policies or algorithms. Load statistics can be determined from data collected dynamically from the switches and network or network configuration data stored locally. A port is selected according to switch port selection criteria, or in the case of two new nodes being connected to the network as a heavily interacting pair, two ports may be selected according to switch port selection criteria.

Figure 15:
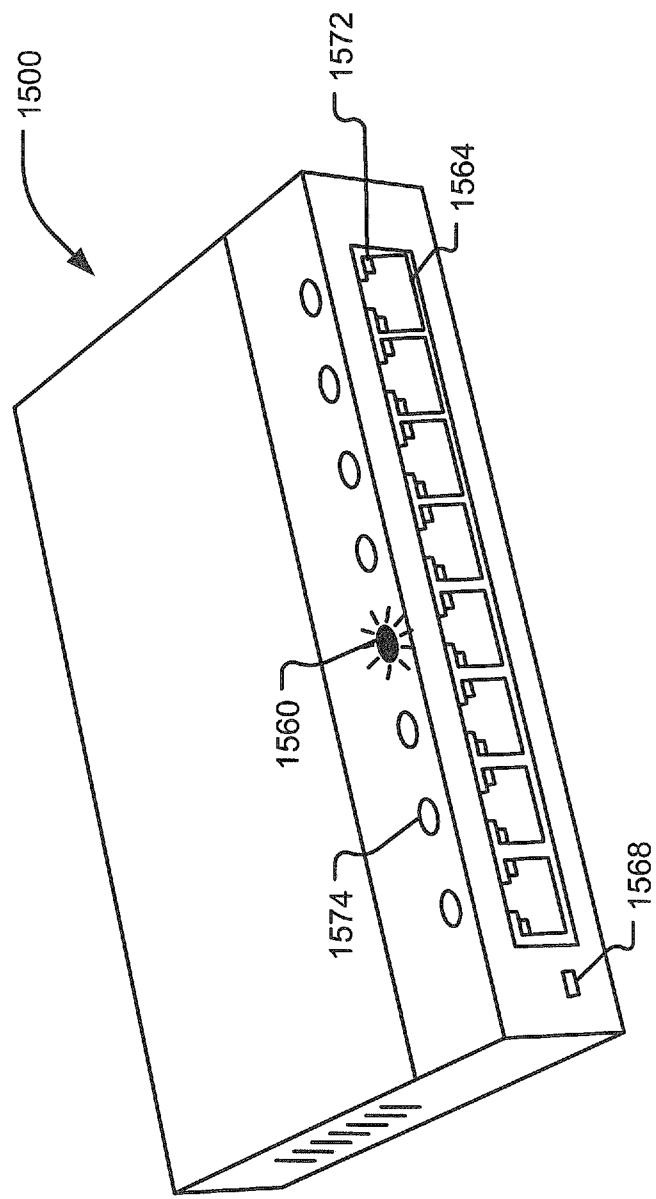
FIG. 15 illustrates an example switch with an indicator suggesting a switch port for attaching a node to a network.

FIG. 15 illustrates an example switch 1500 with an illuminated indicator 1560 suggesting a switch port 1564 for attaching a new node to a network. The switch 1500 illustrated in FIG. 15 has a power indicator 1568 and eight ports 1564 with corresponding data connection indicators 1572. However, other switch designs, switch port orientations, and switch port quantities are contemplated herein. Each of the switch ports 1564 also has a corresponding port suggestion indicator 1574. In FIG. 15, the port suggestion indicators 1574 are positioned on top of the switch 1500, each oriented vertically from its corresponding switch port 1564. However, other orientations and designs of port suggestion indicators 1574 are contemplated herein. The port suggestion indicators 1574 each are capable of suggesting a switch port 1564 for adding a network node to the network (i.e. provisioning the network). Here, the illuminated indicator 1560 suggests the fourth switch port 1564 from the left of the switch 1500 for adding a network node to the network. Illuminated indicators may also distinguish between members of a pair of new nodes to be added to a network (e.g., light blinks one color for connection of a server and another color for connection of a storage device).

Figure 16:
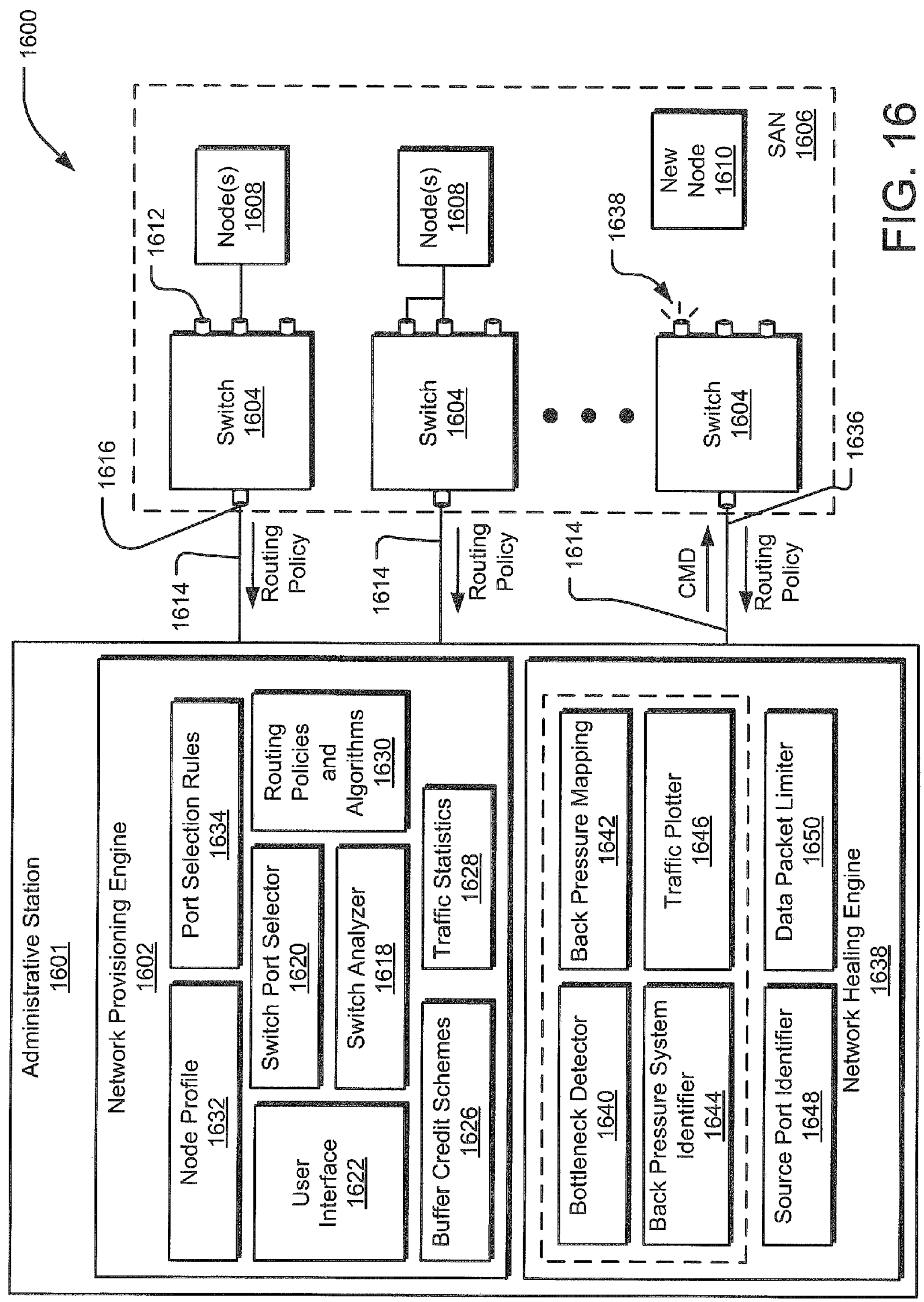
FIG. 16 illustrates an example operating environment including a network provisioning engine and a network healing engine in communication with switches of a network.

FIG. 16 illustrates an example operating environment 1600 including an administrative station 1601 providing a network provisioning engine 1602 and a network healing engine 1638. However, it should be understood that the network provisioning engine 1602 and the network healing engine 1638 may reside on different systems (e.g., different administrative stations). The administrative station 1601 is in communication with switches 1604 of a network (e.g., a storage area network (SAN) 1606). Note: Each component described in FIG. 16 includes hardware or a combination of hardware and software. SAN 1606 includes a number of nodes 1608, which may include without limitation server computers, storage arrays, tape backup devices, and other devices. The SAN 1606 may be distributed over multiple sites of an enterprise, where some of the switches 1604 and nodes 1608 are at one site and other switches 1604 and nodes 1608 are at another site and communication between the multiple sites is accomplished over a local area network (LAN) and/or a wide area network (WAN).

In this implementation, the switches 1604 are Fibre Channel switches, but the presently disclosed technology is not so limited. Accordingly, it should be understood that the described technology may also be applied outside of a SAN environment, such as a strictly LAN or WAN communications environment.

In general, the provisioning engine 1602 selects one or more switch ports 1612 to which a new node 1610 should be connected, according to switch port selection criteria and based on the back pressure mapping discussed specifically with regard to FIGS. 1-6. Further, the SAN 1606 may be local or remote relative to the provisioning engine 1602. The switches 1604 each have ports 1612 to which nodes 1608 can connect into the SAN 1606. Ports 1612 may each have an indicator, such as a light emitting diode (LED) 1638, although other indicators, such as a digital display on a switch 1604 or on the administrative station 1601 may be employed.

The administrative station 1601 (including the provisioning engine 1602 and/or healing engine 1638) can be implemented in a special purpose or general purpose computing device, such as a server computer or management workstation. The administrative station 1601 is communicatively connected to each switch 1604 through Ethernet connections 1614 to management ports 1616 on each switch 1604. Typically switches 1604 provide a management interface separate from the primary data paths so that out-of-band management can be used. For example, a typical Fibre Channel switch includes an Ethernet management port. Via the connections 1614, the administrative station 1601 can send commands to the switches 1604 and the switches 1604 can send data to the administrative station 1601. In another implementation, the administrative station 1601 is connected to the switches 1604 via a common connection to the SAN 1606 rather than individual connections to each of the switches 1604.

In the illustrated implementation, the provisioning engine 1602 includes a number of functional modules and data for use in analyzing switch 1602 configurations, traffic patterns and new node 1610 parameters to select a switch port 1612 based on the switch port selection criteria. The provisioning engine 1602 illustrated in FIG. 16 includes a switch analyzer 1618 (e.g., uses knowledge of buffer credit schemes and routing policies to assist in providing a switch port selection/suggestion for a new node), a switch port selector 1620 (e.g., analyzes a user query, configuration data, network statistics and user policies, such as switch port selection criteria, to provide a switch port selection/suggestion for a new node), a user interface 1622 (e.g., provides a command line or graphical system for an administrator to specify the node parameters and to view the suggestions for the provisioning activity), buffer credit schemes 1626 (e.g., specifies the number of buffer credits available at each port in the network and the manner in which those credits will be shared by multiple distinct traffic flows at each port), traffic statistics 1628 (e.g., specifying the expected direction, endpoints, volume and temporal variations in the traffic received or transmitted by the nodes being considered in the provisioning operation), routing policies/algorithms 1630 (e.g., contains a topological representation of the network, along with the set of shortest paths between node pairs connected to the network), node profile(s) 1632 (e.g., specifies the hardware and operational characteristics of a node), and switch port selection rules 1634 (e.g., specifies criteria that govern the preference given to a switch port in the selection process, incorporating factors such as policy constraints on which a given kind of device can be placed in the network, load balancing consideration, path length constraints, etc.).

Further, the healing engine 1638 includes a number of functional modules for use in back pressure mapping and limiting data transfer over bottlenecked nodes within the network. Each module is embodied in hardware (including potentially logic circuitry, memory circuitry and/or a storage device) or a combination of hardware and software. The healing engine 1638 illustrated in FIG. 16 includes a bottleneck detector 1640 (e.g., determines whether a given port at a given time is a congestion or slow-drain bottleneck and distinguishes between primary bottlenecks and dependent bottlenecks), a back pressure mapping module 1642 (e.g., defines in memory an abstract representation, such as a graph data structure, of the bottlenecks and back pressure in the network, using nodes to represent bottlenecks and arcs to represent links), a back pressure system identifier 1644 (e.g., decomposes the representation of back pressure in the network into independent back pressure systems, defining a sub-graph in the back pressure graph for each independent back pressure system), a traffic plotter 1646 (e.g., identifies source and destination ports for traffic flows in the network to supplement the use of the back pressure graph in identifying source ports for given flows), a source port identifier 1648 (e.g., identifies the source ports for traffic arriving at a bottlenecked port by following the back pressure graph upstream with respect to traffic), and a data packet limiter 1650 (e.g., applies a rate limit on the traffic entering the network at an ingress port).

In one implementation, the network healing engine 1638 and the provisioning engine 1602 are contained within the administrative station 1601 that is connected to the switches 1604. The network healing engine 1638 and the provisioning engine 1602 can interact with one another via inter-process communication. In another implementation, the network healing engine 1638 and the provisioning engine 1602 are contained within separate computers on a local area network that is also connected to the switches 1604. The network healing engine 1638, provisioning engine 1602, and switches 1604 can all interact with one another via Ethernet over the local area network. The bottleneck detector 1640 identifies which switches 1604, and in some implementations which ports 1612 of switches 1604, within the SAN 1606 are bottlenecks. The ports may be identified by a variety of identifiers, such as slot and port #, domain ID, World Wide Name (WWN) of the node attached to the port, or the WWN of the port, an arbitrary identifier known to the healing engine 1638 and the provisioning engine 1602, etc. The back pressure mapping module 1642 maps back pressure between switches 1604 of the SAN 1606. The bottleneck detector 1640 then separates primary bottlenecks from dependent bottlenecks based on the back pressure mapping. Further, multiple independent back pressure systems, if present, are distinguished from one another by the back pressure system identifier 1644. The bottleneck detector 1640, back pressure mapping module 1642, and back pressure system identifier 1644 effectively perform the back pressure mapping to be used for either network healing or network provisioning. For additional detail regarding back pressure mapping, see FIGS. 1-8.

The traffic plotter 1646 identifies source and destination ports for traffic flows within the network, and the source port identifier 1648 follows the back pressure graph upstream with respect to traffic flow to identify source ports of individual flows. The data packet limiter 1650 then limits the data flow rate, re-routes data traffic from the source ports, and or adds additional bandwidth to congested links so that all downstream bottlenecks from the source ports, all the way to the primary bottlenecks, are resolved. For additional detail regarding network healing, see descriptions of FIGS. 9-15. Alternatively, the rate capacity of the primary bottlenecks may be increased or data traffic may be diverted to another outgoing port at the primary bottleneck to resolve the bottlenecks.

The network provisioning module 1602 may be used in conjunction with the healing module 1638 or separately therefrom. In one implementation, the switch analyzer 1618 uses buffer credit schemes 1626 and routing policies/algorithms 1630 to determine traffic statistics 1628. In another implementation, the traffic statistics 1628 are derived from one or more of the bottleneck detector 1640, back pressure mapping 1642, back pressure system identifier 1644, traffic plotter 1646, and source port identifier 1648 of the healing engine 1638.

Traffic statistics 1628 include data related to traffic load being handled by the switches 1604 and may indicate load handled by each switch 1604 at various times of day. Routing policies or algorithms, bottlenecked ports, or other data relevant to the switches 1604 may be retrieved from the switches 1604 over connections 1614. Switch data (e.g., routing policies) may be collected automatically on a substantially periodic basis or on an event driven basis, such as in response to a user input.

User interface 1622 receives input from a user that the switch port selector 1620 uses to select a port 1612 for attaching the new node 1610. In one implementation, the user interface 1622 is a graphical user interface that includes data entry fields where the user can create a new node profile 1632 that includes new node parameters. The user may be prompted to enter new node 1610 parameters, such as the node type, bandwidth usage profile, physical location of the new node, fail-over information, and others. Node type may specify whether the new node 1610 is a host or target node. Physical location may specify which switch(es) the new node 1610 can physically connect to. The bandwidth usage profile may specify the maximum, average, and/or minimum load associated with the new node 1610, the time of day of the load (e.g., load as a function of time, time of maximum load, time of minimum load, etc.), and/or the type of data communicated by the new node 1610. Fail-over information may specify alternate paths or connections to the network. When a user creates a node profile 1632, it can be saved for later use (e.g., to allow for updating the node profile 1632 later). When a node profile 1632 is updated, the switch port selection analysis can be performed again to determine if a node associated with the node profile 1632 should be moved to another port based on the updated node profile 1632.

Node parameters in the node profile 1632 can be used to identify a preferred switch port 1612 for the new node 1610. The switch port selector 1620 includes a rule-based algorithm that applies switch port selection rules 1634 to determine a switch port 1612. The rules 1634 specify how a switch 1604 and/or port 1612 should be selected based on a number of switch port selection criteria, such as traffic statistics 1628, back pressure mapping 1642, node parameters, and/or routing policies 1630. Switch port selection criteria may be combined using Boolean logic and/or combined using a weighting or ranking algorithm. Example switch port selection criteria 1634 are shown here:

- Select a switch and/or port that utilizes a minimum number of bottlenecked ports (e.g., zero bottlenecked ports)
- Select a switch and/or port that utilizes no links connected to bottlenecked ports
- Select a switch with the shortest paths to its zoned targets
- On the selected switch, select the ASIC that is least used (e.g., has the highest remaining bandwidth)
- Select a switch based on the new node location
- Do not select the same switch as the fail-over connection location
- Select a port that most substantially balances load across the switches
- Select a port that most substantially balances load across the switches at specified time periods throughout the day For example, a switch port selection criterion may specify a switch port positioned within a communications route through a network between a new node and a communication partner node of the new node, the communications route being selected to satisfy one or more port selection criteria (e.g., a rule specifying a minimal number of bottlenecks in the communications route).

The rule-based algorithm reads the switch port selection rules 1634 and applies the switch port selection rules 1634 based on one or more of the traffic statistics 1628, back pressure mapping 1642, and the new node 1610 parameters. One or more or all of the switch port selection rules 1634 may be applied. If multiple switch port selection rules 1634 are conflicting, a mechanism is provided whereby the conflict is removed. For example, only one of the conflicting switch port selection rules 1634 may be applied based on a hierarchy specifying a switch port selection rules priority, and/or user input specifying a rule preference. In one implementation, a number of switch port selection rules 1634 are provided in a registry or database from which desired switch port selection rules 1634 may be selected. For example, the user may be able to select which switch port selection rules 1634 are desired through the user interface 1622.

With further regard to the rule-based algorithm of the switch port selector 1620, routes through the network can be examined based on the physical location specified for the new node 1610. The physical location can be read from the new node profile 1632. If the routes associated with this location show high levels of back pressure then a switch 1604 at an alternate location is selected. The switch 1604 at the alternate location may be the switch 1604 with the shortest paths to its zoned targets. If the added bandwidth projections associated with the new node 1610 (e.g., as specified in the new node profile 1632) will cause bottlenecking, then a switch 1604 at an alternate location is selected. In the foregoing route analysis, information is collected from each live switch/firmware in the path.

The switch port selector 1620 can update information about back pressure systems based on the most recent addition, move, or update to the node profiles 1632 before new nodes 1610 are added. If all paths/locations have equal back pressure, the user is warned of the back pressure. In addition, the switch port selector 1620 can offer the shortest equal path to the user for selection. The warning or message to the user could also include suggestions for adding new ISLs, or where to add new switches 1604 to alleviate back pressure.

In one implementation, after switch port selector 1620 selects the preferred switch port 1612, a command (CMD) 1636 is sent to the selected switch 1604. The command 1636 commands the switch 1604 to trigger a port suggestion indicator (e.g., to turn on an LED 1638) corresponding to the selected port. The command 1636 therefore specifies the selected port and the indicating action to be taken (e.g., to light the LED 1638). In some implementations, the LED 1638 is blinked for a designated amount of time. The LED 1638 is visible to a technician who can attach the new node 1610 to the selected port corresponding to the lit LED 1638. Other port suggestion indicators may be employed, including without limitation a digital readout on the switch or administrative station, a short message service (SMS) message or email to the technician, etc.

In another implementation, after the switch port selector 1620 determines the preferred switch and port, the UI 1622 communicates to the user the determined switch 1604 and port 1612. The user is prompted (e.g., at the administrative station or switch) to confirm the switch 1604 and port 1612 selected for attaching the new node 1610. If the user confirms the selection, the command 1636 is then sent to the selected switch 1604. In some implementations, the UI 1622 notifies the user that another inter-switch link should be added. In some implementations, if a selected switch 1604 and port 1612 are proposed to the user, but the user does not confirm the selection, the switch port selector 1620 selects the next best port 1612 for connecting the new node 1610.

As previously discussed, the described technology may be implemented fully or partially in firmware, in which software is executed on individual switching devices. In this case, one or more switches may be responsible for performing functionality of the administrative station described above, or the administrative station may be employed in combination with this firmware implementation. Furthermore, the various modules, circuitry, and logic may be executed by or in combination with one or more processors, such as a processor in a switch device and/or an administrative workstation.

Figure 17:
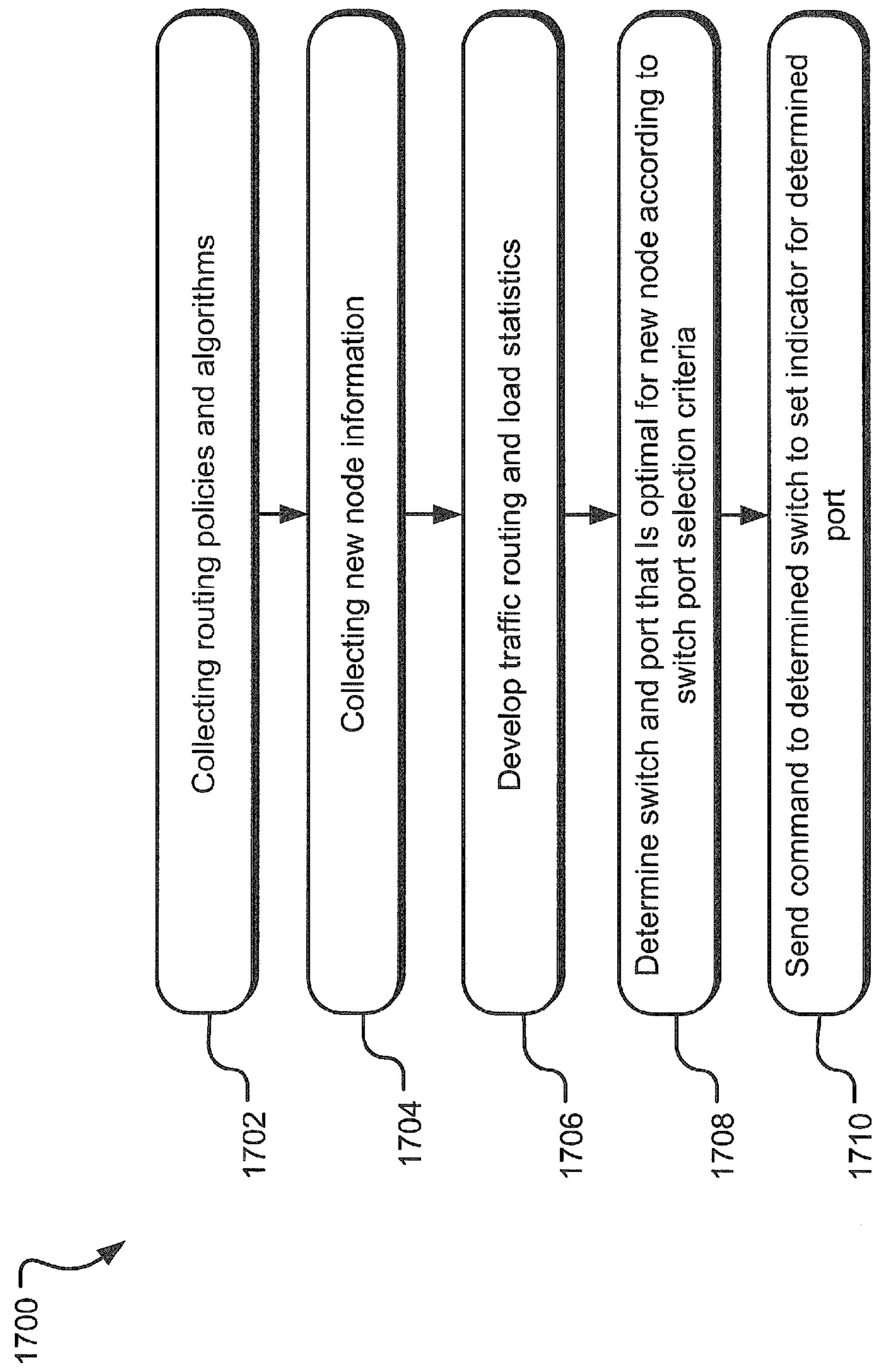
FIG. 17 illustrates example operations for providing network provisioning.

FIG. 17 illustrates example operations 1700 for providing network provisioning. A collecting operation 1702 collects routing policies of the switches. One implementation of the collecting operation 1702 send commands to the switches commanding the switches to send their routing policies or algorithms. Another implementation of the collecting operation 1702 receives bottleneck identification and/or back pressure mapping from the switches. Another collecting operation 1704 collects new or updated node information and stores the new or updated node information in a node profile. One implementation of the collecting operation 1704 receives new or updated node parameters from a user. New node parameters may include, but are not limited to, node type, bandwidth profile (e.g., maximum load associated with the new node, minimum load associated with the new node, time of day of maximum load, time of day of minimum load), and type of data communicated by the new node. Updated node parameters may include a change to a bandwidth profile, which may change for example, when additional virtual machines are being added to a host or if there is a change in the amount of jobs or traffic load handled by the node.

A developing operation 1706 creates traffic routing and load statistics based on the bottleneck identification and/or back pressure mapping, data received from the switches, and other data. In one implementation of the developing operation 1706, buffer credit schemes associated with each switch and the routing policy of each switch are analyzed to generate load statistics related to each of the switches.

A determining operation 1708 determines an optimal switch port for a new node using the switch load statistics and the new/updated node information. The determining operation 1708 applies switch port selection rules to the back pressure map, traffic statistics, and node parameters to yield one or more optimal switch ports. For example, a determining operation 1708 may determine a switch port in a manner that substantially balances load across multiple switches. Where an enterprise SAN has multiple switches in each of multiple enterprise sites, the determining operation 1708 may choose the switch port such that load is balanced across switches at the site where the new/updated node is to be attached. The determining operation 1708 may also suggest port options to the user, and prompt the user to select from among a proposed set of switch ports.

After the switch port is selected, a sending operation 1710 sends a command to the selected switch to trigger a port suggestion indicator (e.g., to light an LED) for the selected port. In one implementation, sending operation 1710 sends the command over an Ethernet connection to a management port of the selected switch. For example, after the command is sent to the switch, the switch lights the LED so that a user at the switch can see which port the new/updated node should be connected to.

Figure 18:
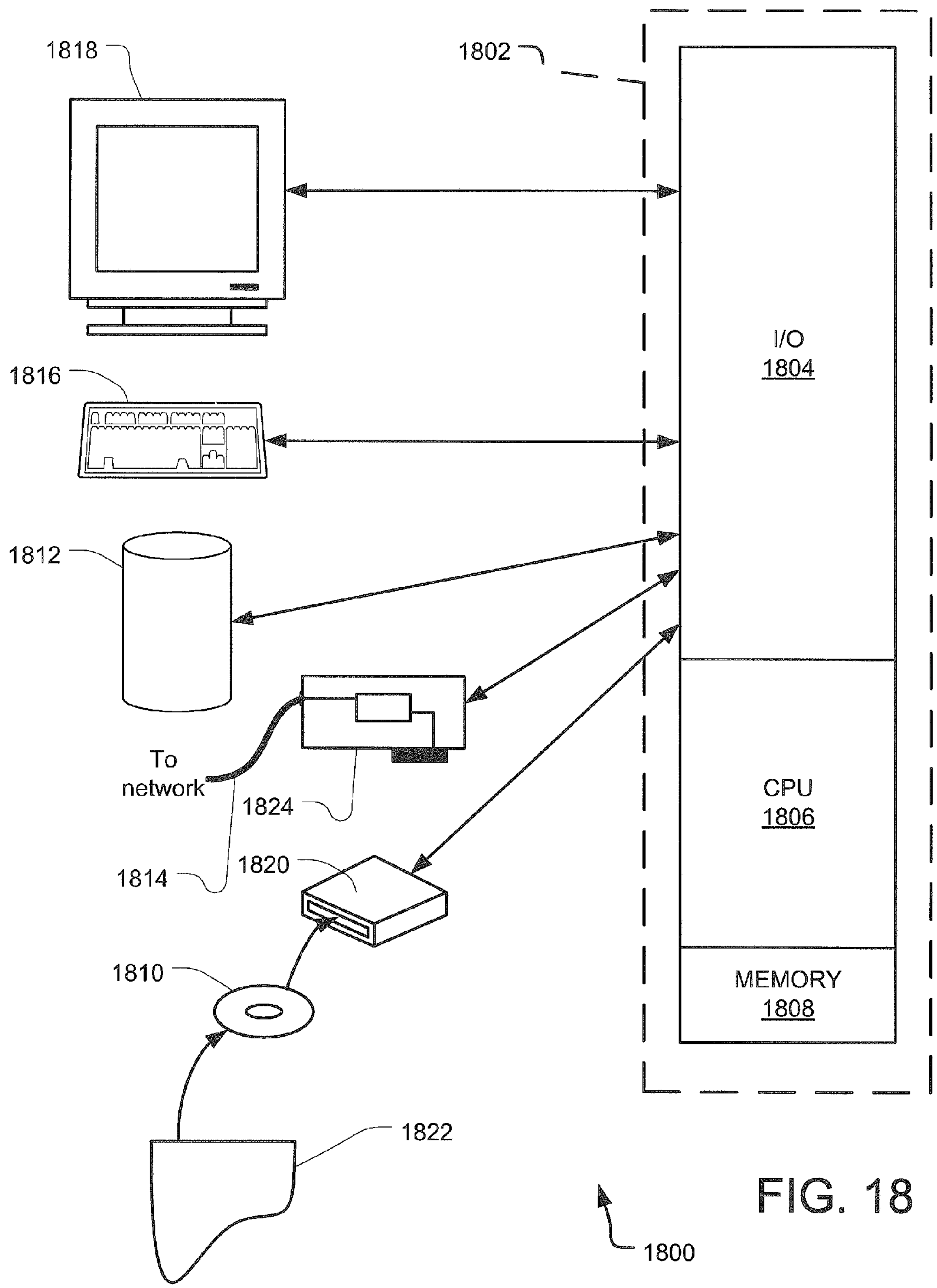
FIG. 18 illustrates an example computing system that can be used to implement the presently disclosed technology.

FIG. 18 illustrates an example computing system that can be used to implement the described technology. A general purpose computer system 1800 is capable of executing a computer program product to execute a computer process. Data and program files may be input to the computer system 1800, which reads the files and executes the programs therein. Some of the elements of a general purpose computer system 1800 are shown in FIG. 18 wherein a processor 1802 is shown having an input/output (I/O) section 1804, a Central Processing Unit (CPU) 1806, and a memory section 1808. There may be one or more processors 1802, such that the processor 1802 of the computer system 1800 comprises a single central-processing unit 1806, or a plurality of processing units, commonly referred to as a parallel processing environment. The computer system 1800 may be a conventional computer, a distributed computer, or any other type of computer. The described technology is optionally implemented in software devices loaded in memory 1808, stored on a configured DVD/CD-ROM 1810 or storage unit 1812, and/or communicated via a wired or wireless network link 1814 on a carrier signal, thereby transforming the computer system 1800 in FIG. 18 to a special purpose machine for implementing the described operations.

The I/O section 1804 is connected to one or more user-interface devices (e.g., a keyboard 1816 and a display unit 1818), a disk storage unit 1812, and a disk drive unit 1820. Generally, in contemporary systems, the disk drive unit 1820 is a DVD/CD-ROM drive unit capable of reading the DVD/CD-ROM medium 1810, which typically contains programs and data 1822. Computer program products containing mechanisms to effectuate the systems and methods in accordance with the described technology may reside in the memory section 1804, on a disk storage unit 1812, or on the DVD/CD-ROM medium 1810 of such a system 1800. Alternatively, a disk drive unit 1820 may be replaced or supplemented by a floppy drive unit, a tape drive unit, or other storage medium drive unit. The network adapter 1824 is capable of connecting the computer system to a network via the network link 1814, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system. It should be understood that computing systems may also embody devices such as Personal Digital Assistants (PDAs), mobile phones, gaming consoles, set top boxes, etc.

When used in a LAN-networking environment, the computer system 1800 is connected (by wired connection or wirelessly) to a local network through the network interface or adapter 1824, which is one type of communications device. When used in a WAN-networking environment, the computer system 1800 typically includes a modem, a network adapter, or any other type of communications device for establishing communications over the wide area network. In a networked environment, program modules depicted relative to the computer system 1800 or portions thereof, may be stored in a remote memory storage device. It is appreciated that the network connections shown are exemplary and other means of and communications devices for establishing a communications link between the computers may be used.

In an example implementation, the network healing engine and/or network provisioning engine may be incorporated as part of the operating system, application programs, or other program modules. A database containing node profiles, switch port selection rules, routing policies and algorithms, buffer credit schemes, and/or traffic statistics may be stored as program data in memory 1808 or other storage systems, such as disk storage unit 1812 or DVD/CD-ROM medium 1810. Still further, the computer system 1800 may be connected to the network of switches (see e.g., FIGS. 1, 2, 6-13, and 16) via the network interface or adapter 1824.

It should be understand that circuitry and/or program instructions in one or more switches, one or more administrative workstations, various combinations of one or more switches and one or more workstations, and other computing system implementations may represent example embodiments of the technology described herein.

The implementations of the presently disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the presently disclosed technology. Accordingly, the logical operations making up the implementations of the presently disclosed technology described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example implementations of the presently disclosed technology. Since many implementations of the presently disclosed technology can be made without departing from the spirit and scope of the presently disclosed technology, the presently disclosed technology resides in the claims hereinafter appended. Furthermore, structural features of the different implementations may be combined in yet another implementation without departing from the recited claims.

What is claimed is:

1. A computing system comprising:

a plurality of switch ports, a first portion of said plurality of ports being connected ports configured for connection to switches in the computing system and at least one of said plurality of ports being an unconnected port capable of connection with a device and not configured as connected to a device; and switch port selector logic configured to select one of said at least one unconnected port based on back pressure mapping, said selected at least one unconnected port including a light source associated with the port, and to provide a command directing that said light source associated with said selected at least one unconnected port be illuminated, wherein back pressure mapping includes an identification of independent back pressure systems present in a network, and wherein a back pressure system includes at least one primary bottlenecked port and all the bottlenecked ports dependent therefrom.

2. The computing system of claim 1, wherein the illumination is in a blinking format.

3. The computing system of claim 1, wherein the computing system further comprises:

an administrative workstation configured to generate the command directing that said light source be illuminated.

4. The computing system of claim 1, further comprising:

storage configured to store switch port selection criteria; and wherein said switch port selector logic is configured to access the switch port selection criteria in the storage to select said one of said at least one unconnected port.

5. The computing system of claim 1, wherein the selected at least one unconnected port is positioned within a communications route between a first new node and a second new node, the communications route being selected to satisfy one or more port selection criteria.

6. The computing system of claim 5, wherein the one or more port selection criteria include a rule to select the communications route to avoid one or more bottlenecks.

7. The computing system of claim 1, wherein said switch port selector logic is further configured to select a second of said at least one unconnected port based on back pressure mapping, said selected second at least one unconnected port including a light source associated with the port, and to provide a command directing that said light source associated with said second selected at least one unconnected port be illuminated, wherein said one of said at least one unconnected port is associated with connection of a first new node to switch, and a second of said at least one unconnected port is associated with connection of a second new node to provide a communications route through a network between the first new node and the second new node, the communications route being selected to avoid one or more bottlenecks in the network between the first node and the second new node.

8. A method comprising:

selecting one of at least one unconnected port on a switch based on back pressure mapping, the switch including a plurality of switch ports, a first portion of said plurality of ports being connected ports configured for connection to switches in a computing system and at least one of said plurality of ports being an unconnected port capable of connection with a device and not configured as connected to a device, said selected at least one unconnected port including a light source associated with the port; and providing a command directing that said light source associated with said selected at least one unconnected port be illuminated, wherein back pressure mapping includes an identification of independent back pressure systems present in a network, and wherein a back pressure system includes at least one primary bottlenecked port and all the bottlenecked ports depedent therefrom.

9. The method of claim 8, wherein the illumination is in a blinking format.

10. The method of claim 8, further comprising:

selecting a second of said at least one unconnected port based on back pressure mapping, said selected second at least one unconnected port including a light source associated with the port;

providing a command directing that said light source associated with said second selected at least one unconnected port be illuminated, wherein said one of said at least one unconnected port is associated with connection of a first new node to switch, and said second of said at least one unconnected port is associated with connection of a second new node to provide a communications route through a network between the first new node and the second new node, the communications route being selected to avoid one or more bottlenecks in the network between the first node and the second new node.

11. One or more non-transitory computer readable media encoding computer-executable instructions for executing on a computern system a computing process, the computing process comprising:

selecting one of at least one unconnected port on a switch based on back pressure mapping, the switch including a plurality of switch ports, a first portion of said plurality of ports being connected ports configured for connection to switches in a computing system and at least one of said plurality of ports being an unconnected port capable of connection with a device and not configured as connected to a device, said selected at least one unconnected port including a light source associated with the port; and providing a command directing that said light source associated with said selected at least one unconnected port be illuminated, wherein back pressure mapping includes an identification of independent back pressure systems present in a network, and wherein a back pressure system includes at least one primary bottlenecked port and all the bottlenecked ports dependent therefrom.

12. The one or more non-transitory computer readable media of claim 11, wherein the illumination is in a blinking format.

13. The one or more non-transitory computer readable media of claim 11, the computing process further comprising:

selecting a second of said at least one unconnected port based on back pressure mapping, said selected second at least one unconnected port including a light source associated with the port;

providing a command directing that said light source associated with said second selected at least one unconnected port be illuminated, wherein said one of said at least one unconnected port is associated with connection of a first new node to switch, and said second of said at least one unconnected port is associated with connection of a second new node to provide a communications route through a network between the first new node and the second new node, the communications route being selected to avoid one or more bottlenecks in the network between the first node and the second new node.

* * * * *